(12) United States Patent
Kovach et al.

(10) Patent No.: US 11,297,757 B2
(45) Date of Patent: Apr. 12, 2022

(54) SYSTEM FOR MONITORING THE DISPLACEMENT OF A GROUND ENGAGING TOOL

(71) Applicant: CNH Industrial America LLC, New Holland, PA (US)

(72) Inventors: Michael G. Kovach, Morton, IL (US); Christopher Barrick, Morton, IL (US); John C. Endlsey, Washington, IL (US); James W. Henry, Saskatchewan (CA); Tracey D. Meiners, Mackinaw, IL (US); Klint J. Peterson, Mackinaw, IL (US); Alan Forbes, Waterford, WI (US); David Long, Washington, IL (US); Christopher A. Lursen, Shell Rock, IA (US)

(73) Assignee: CNH Industrial America LLC, New Holland, PA (US)

( * ) Notice: Subject to any disclaimer, the term of this patent is extended or adjusted under 35 U.S.C. 154(b) by 481 days.

(21) Appl. No.: 16/273,639

(22) Filed: Feb. 12, 2019

(65) Prior Publication Data
US 2019/0246548 A1    Aug. 15, 2019

Related U.S. Application Data

(60) Provisional application No. 62/629,762, filed on Feb. 13, 2018.

(51) Int. Cl.
*A01B 63/32* (2006.01)
*A01B 79/00* (2006.01)
*A01B 3/24* (2006.01)

(52) U.S. Cl.
CPC .............. *A01B 79/005* (2013.01); *A01B 3/24* (2013.01); *A01B 63/32* (2013.01)

(58) Field of Classification Search
CPC ....... A01B 3/24; A01B 33/025; A01B 33/087; A01B 49/027; A01B 63/1115; A01B 63/32; A01B 79/005
See application file for complete search history.

(56) References Cited

U.S. PATENT DOCUMENTS 8,827,001 B2   9/2014   Wendte et al.
8,857,530 B2   10/2014  Henry
(Continued)

FOREIGN PATENT DOCUMENTS

WO   WO 2017/158006   9/2017

OTHER PUBLICATIONS

John Deere "AccuDepth System Performs All Depth Control and Frame-Leveling Functions" Dated Dec. 11, 2017 (3 pages).
John Deere "1870 air Hoe Drill" Dated Dec. 11, 2017 (4 pages).

*Primary Examiner* — Gary S Hartmann
(74) *Attorney, Agent, or Firm* — Rebecca L. Henkel; Rickard K. DeMille

(57) ABSTRACT

A system for monitoring the displacement of a ground engaging tool of an agricultural implement includes a controller of the system may be configured to monitor a magnitude of a displacement defined between a current position of a ground engaging tool of the implement and a predetermined ground engaging tool position. The controller may also be configured to initiate a first control action when it is determined that the magnitude of the displacement of the ground engaging tool exceeds a first threshold displacement value. Moreover, the controller may further be configured to initiate a second control action when it is determined that the magnitude of the displacement of the ground engaging tool exceeds a second threshold displacement value, with the second threshold displacement value corresponding to a greater displacement relative to the predetermined ground (Continued)

engaging tool position than the first displacement threshold value.

17 Claims, 13 Drawing Sheets

(56) References Cited

U.S. PATENT DOCUMENTS

| | | |
|---|---|---|
| 9,113,589 B2 | 8/2015 | Bassett |
| 9,510,498 B2 | 12/2016 | Tuttle et al. |
| 9,554,504 B2 | 1/2017 | Houck |
| 9,572,296 B2 | 2/2017 | Henry et al. |
| 9,585,298 B2 | 3/2017 | Henry et al. |
| 9,609,799 B2 | 4/2017 | Henry |
| 9,609,800 B2 | 4/2017 | Henry |
| 9,615,499 B2 | 4/2017 | Kowalchuk et al. |
| 9,674,999 B2 | 6/2017 | Achen et al. |
| 9,961,823 B2 * | 5/2018 | Sporrer ................. A01B 63/22 |
| 10,440,876 B2 * | 10/2019 | Sporrer ................... A01B 5/04 |
| 10,667,454 B2 * | 6/2020 | Sporrer ................ A01B 63/111 |
| 2017/0251587 A1 | 9/2017 | Sporrer et al. |

* cited by examiner

SYSTEM FOR MONITORING THE DISPLACEMENT OF A GROUND ENGAGING TOOL

FIELD

The present disclosure generally relates to agricultural harvesters and, more particularly, to systems and methods for monitoring the displacement of one or more ground engaging tools of an agricultural implement.

BACKGROUND

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include a plurality of ground engaging tools configured to penetrate the soil to a particular depth. In this respect, the ground engaging tools may be pivotally coupled to a frame of the tillage implement. Tillage implements may also include biasing elements, such as springs, configured to exert biasing forces on the ground engaging tools. This configuration may allow the ground engaging tools to maintain the particular depth of soil penetration as the agricultural work vehicle pulls the tillage implement through the field. Additionally, this configuration may also permit the ground engaging tools to pivot out of the way of rocks or other impediments in the soil, thereby preventing damage to the ground engaging tools or other components on the implement.

When performing a tillage operation, it is desirable to create a level and uniform layer of tilled soil across the field to form a proper seedbed for subsequent planting operations. However, firm or compacted soil in certain portions of the field may exert a great enough force on the ground engaging tools to overcome the biasing force of the ground engaging tools. In this respect, the ground engaging tools may pivot relative to the implement frame over an extended period of time such that the depth of soil penetration decreases. Such pivoting of the ground engaging tools may result in an uneven seedbed.

Accordingly, an improved system and method for monitoring the displacement of a grounds engaging tool of an agricultural implement would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to a system for monitoring the displacement of a ground engaging tool of an agricultural implement. The system may include an implement having a frame and a ground engaging tool pivotally coupled to the frame, with the ground engaging tool configured to be biased to a predetermined ground engaging tool position relative to the frame. The system may also include a sensor configured to detect a parameter indicative of a current position of the ground engaging tool relative to the frame. Furthermore, the system may include a controller communicatively coupled to the sensor. The controller may be configured to monitor a magnitude of a displacement defined between the current position of the ground engaging tool and the predetermined ground engaging tool position based on measurement signals received from the sensor. The controller may also be configured to initiate a first control action when it is determined that the magnitude of the displacement of the ground engaging tool exceeds a first threshold displacement value. Moreover, the controller may further be configured to initiate a second control action when it is determined that the magnitude of the displacement of the ground engaging tool exceeds a second threshold displacement value, with the second threshold displacement value corresponding to a greater displacement relative to the predetermined ground engaging tool position than the first displacement threshold value.

In another aspect, the present subject matter is directed to a method for monitoring a displacement of a ground engaging tool of an agricultural implement. The ground engaging tool may be normally biased to a predetermined ground engaging tool position relative to a frame of the implement. The method may include monitoring, with a computing device, a magnitude of a displacement defined between a current position of the ground engaging tool and the predetermined ground engaging tool position. The method may also include initiating, with the computing device, a first control action when it is determined that the magnitude of the displacement of the ground engaging tool exceeds a first threshold displacement value. Furthermore, the method may include initiating, with the computing device, a second control action when it is determined that the magnitude of the displacement of the ground engaging tool exceeds a second threshold displacement value, with the second threshold displacement value corresponding to a greater displacement relative to the predetermined ground engaging tool position than the first displacement threshold value.

In a further aspect, the present subject matter is directed to a method for monitoring displacement of a ground engaging tool of an agricultural implement. The ground engaging tool may be normally biased to a predetermined ground engaging tool position relative to a frame of the implement. The method may include monitoring, with a computing device, a magnitude of a displacement defined between a current position of the ground engaging tool and the predetermined ground engaging tool position. The method may also include comparing, with the computing device, the monitored displacement of the ground engaging tool to both a first threshold displacement value and a second threshold displacement value, with the second threshold displacement value corresponding to a greater displacement relative to the predetermined ground engaging tool position than the first threshold displacement value. The method may further include presenting, with the computing device, a user interface to an operator of the implement, with the user interface including at least one interface element providing the operator with a visual indicator associated with the displacement of the ground engaging tool. Moreover, when the monitored displacement exceeds the first threshold displacement value, the method may include updating, with the computing device, the at least one interface element to provide the operator with a visual indication of the change in the displacement of the ground engaging tool. Furthermore, when the monitored displacement exceeds the second threshold displacement value, the method may include updating, with the computing device, the at least one interface element to provide the operator with a visual indication of further change in the displacement of the ground engaging tool.

In yet another aspect, the present subject matter is directed to a method for monitoring a displacement of a ground engaging tool of an agricultural implement. The ground engaging tool may be normally biased to a predetermined ground engaging tool position relative to a frame of the implement. The method may include monitoring, with a computing device, a magnitude of a displacement defined between a current position of the ground engaging tool and the predetermined ground engaging tool position as the implement is being pulled through a field. The method may also include presenting, with the computing device, a user interface to an operator of the implement, with the user interface including at least one interface element providing the operator with a visual indicator associated with the displacement of the ground engaging tool. Additionally, as the monitored displacement of the grounding engaging tool varies, the method may include updating, with the computing device, the at least one interface element to provide the operator with a visual indication of the change in the displacement of the ground engaging tool.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
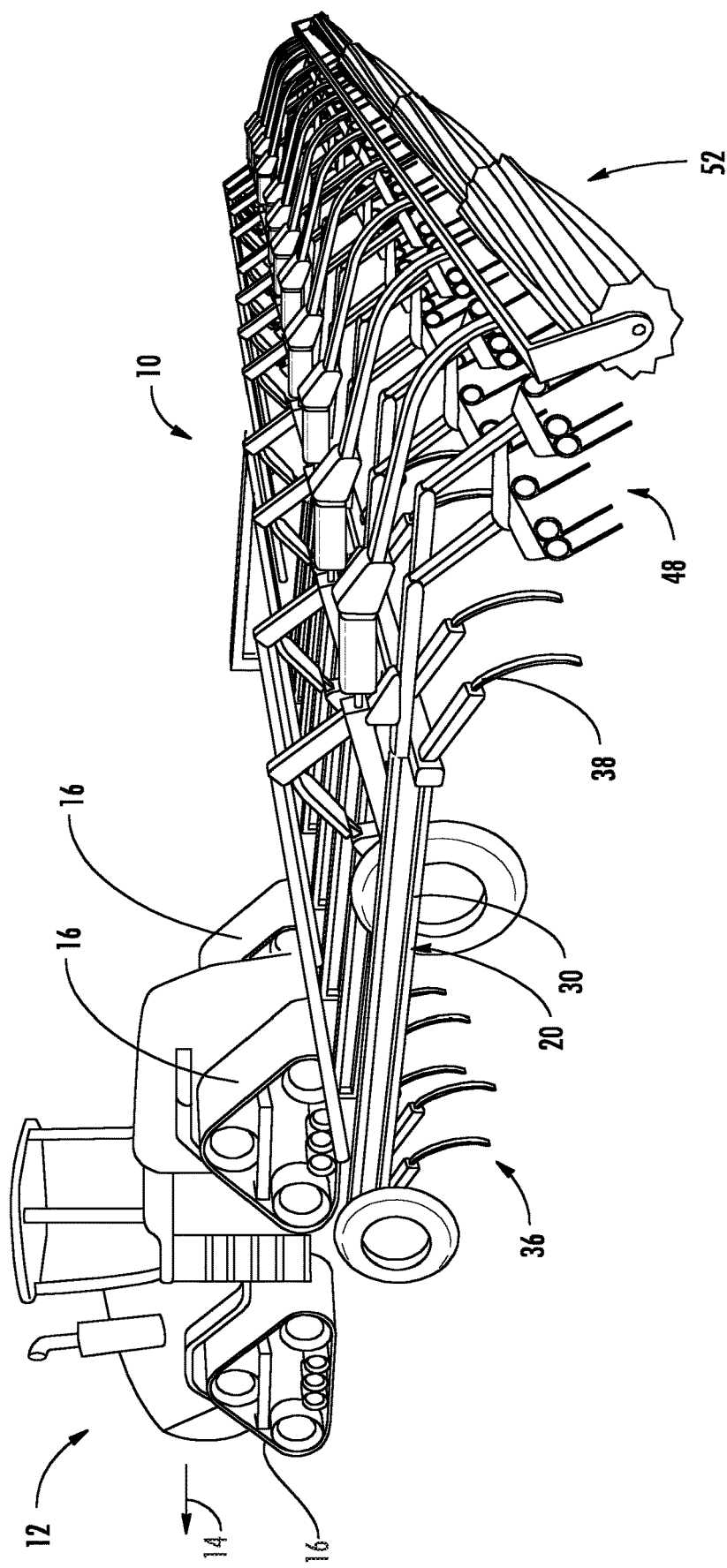
FIG. 1 illustrates a side view of one embodiment of an agricultural harvester in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for monitoring the displacement(s) of one or more ground engaging tools of an agricultural implement. Specifically, in several embodiments, a controller of the disclosed system may be configured to monitor the magnitude(s) of the displacement(s) defined between current position(s) of one or more ground engaging tools and a predetermined ground engaging tool position associated with such tool(s). For instance, one or more of the ground engaging tools may be displaced from their predetermined ground engaging tool position(s) due to the presence of firm or compacted soil or due to a speed at which the implement is being towed by a work vehicle. Alternatively, one or more of the ground engaging tool may be displaced from their predetermined ground engaging tool position(s) due to various other factors associated with operation of the implement, such as when the implement frame is out of level (e.g., by being tipped forward or rearward or when one or more of the wing sections is not level with the remainder of the frame sections) or when a tire pressure(s) of one or more of the wheels of the implement is low.

By monitoring the displacement(s) of one or more of the ground engaging tools, the controller may be configured to compare the monitored displacement value(s) to any number of predetermined threshold displacement values set for the tools. For example, in one embodiment, the controller may be configured to compare the monitored tool displacement value(s) to both a first threshold displacement value and a second threshold displacement value, with the second threshold displacement value corresponding to a greater tool displacement than the first threshold displacement value. In such an embodiment, the controller may be configured to initiate a control action based on the comparison between the currently monitored tool displacement value(s) and the associated threshold value(s). For example, in one embodiment, when the displacement of one or more of the ground engaging tools exceeds the first threshold displacement value (but is still below the second threshold displacement value), the controller may be configured to initiate a first control action. Similarly, when the displacement of one or more of the ground engaging tools exceeds both the first and second threshold displacement values, the controller may be configured to initiate a second control action, which may differ from the first control action or may be similar to or the same as the first control action. For example, each control action may, in one embodiment, be associated with at least one of the following: providing an operator of the implement with a notification associated with the currently monitored tool displacement value(s); adjusting a ground speed of the implement; and adjusting a down pressure exerted on the one or more ground engaging tools whose displacement value(s) has exceeded the first and/or second threshold displacement values.

In accordance with aspects of the present subject matter, the controller may be configured to provide notifications to the operator via a user interface that is presented to the operator via an associated display device (e.g., a display positioned within a cab of the work vehicle towing the implement). In several embodiments, the user interface may include one or more interface elements that provide the operator with a visual indicator associated with the tool displacement(s) of one or more of the ground engaging tools. For example, in one embodiment, the interface element(s) may correspond to a numerical indicator(s) associated with the tool displacement value(s) and/or with a quality indicator(s) of the tillage output of the implement that varies as a function of the displacement of the ground engaging tools (e.g., the quality of the seedbed being created via the associated tillage operation). In another embodiment, the interface element(s) may correspond to a graphical indicator(s) that presents a graphical representation(s) of the tool displacement value(s) and/or a graphical representation(s) of a tillage output of the implement that varies as a function of the displacement(s) of the ground engaging tools (e.g., the quality of the seedbed being created via the associated tillage operation).

Additionally, in several embodiments, the controller may be configured to update or change the interface element(s) with changes in the monitored tool displacement value(s). In this regard, the controller may, for example, be configured to update visual parameters associated with the interface element(s) (e.g., a color, shape, and/or value of the interface element(s)) on a continuous basis and/or as the monitored tool displacement value(s) exceed/fall below the associated tool displacement threshold(s). For instance, when the monitored displacement value(s) exceeds the first and/or second threshold displacement values, the controller may be configured to update the interface element(s) to provide the operator with a visual indication that such threshold displacement value(s) has been exceeded.

Figure 2:
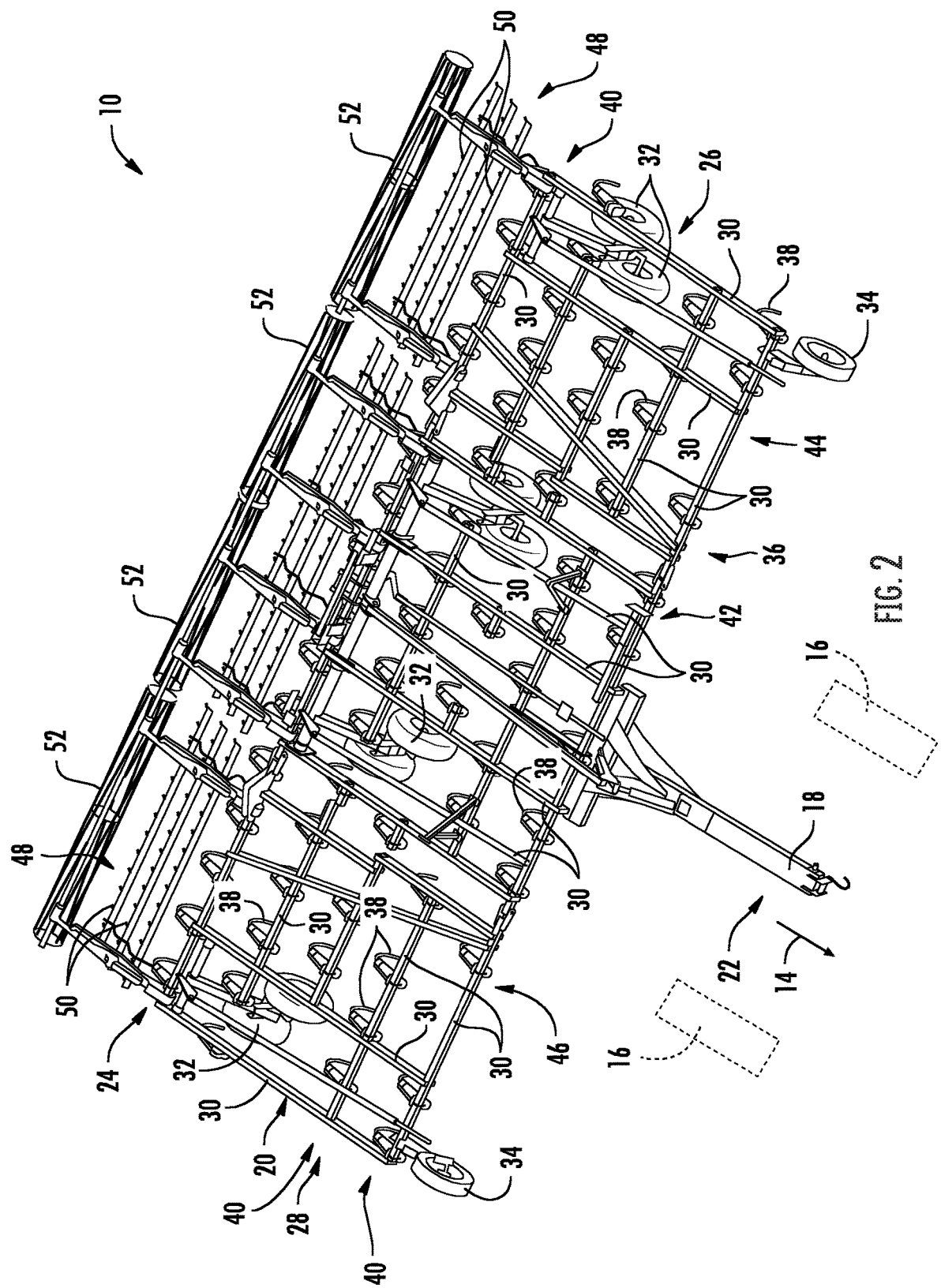
FIG. 2 illustrates an alternative perspective view of an agricultural implement in accordance with aspects of the present subject matter, particularly illustrating various components of the implement.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field along a direction of travel 14 by the work vehicle 12. As shown, the work vehicle 12 may be configured as an agricultural tractor having a plurality of track assemblies 16 for use in traversing the field. It should be appreciated, however, that the work vehicle 12 may be configured as any suitable work vehicle, such as a wheeled vehicle. The implement 10 may be coupled to the work vehicle 12 via a hitch assembly 18 or using any other suitable attachment means. For example, the hitch assembly 18 may couple to an implement frame 20.

As shown, the frame 20 of the implement 10 may extend longitudinally between a forward end 22 and an aft end 24. The frame 20 may also extend laterally between a first side 26 and a second side 28. In this respect, the frame 16 generally includes a plurality of structural frame members 30, such as beams, bars, and/or the like, configured to support or couple to a plurality of components. Additionally, a plurality of wheels may be coupled to the frame 20, such as a set of centrally located wheels 32 and a set of front pivoting wheels 34, to facilitate towing the implement 10 in the direction of travel 14.

In one embodiment, the frame 20 may be configured to support a cultivator 36, which may be configured to till or otherwise break the soil over which the implement 10 travels to create a seedbed. In this respect, the cultivator 36 may include a plurality of ground engaging tools 38, which are pulled through the soil as the implement 10 moves across the field in the direction of travel 14. As will be discussed in greater detail below, the ground engaging tools 38 may be configured to be pivotally mounted to the frame 20 to allow the ground engaging tools 38 pivot out of the way of rocks or other impediments in the soil. As shown, the ground engaging tools 38 may be arranged into a plurality of ranks 40, which are spaced apart from one another longitudinally between the forward end 22 and the aft end 24 of the frame 20.

In several embodiments, the frame 20 may include one or more sections. As illustrated in FIG. 2, for example, the frame 20 may include a main section 42 positioned centrally between the first and second sides 26, 28 of the frame 20. The frame 20 may also include a first wing section 44 positioned proximate to the first side 26 of the frame 20. Similarly, the frame 20 may also include a second wing section 46 positioned proximate to the second side 28 of the frame 20. The first and second wing sections 44, 46 may be pivotally coupled to the main section 42 of the frame 20. In this respect, the first and second wing sections 44, 46 may be configured to fold up relative to the main section 42 to reduce the lateral width of the implement 10 to permit, for example, storage or transportation of the implement on a road. In addition, the wing sections 44, 46 may be configured to be actuated relative to the main section 42 to adjust the levelness of the implement frame 20 (e.g., in the lateral direction extending between the first and second sides 26, 28 of the frame 20) and/or to simply independently adjust the orientation of each wing section 44, 46 relative to the main section 42. It should be appreciated that the frame 20 may include any suitable number of wing sections. For example, in another embodiment, the frame 20 may include two wing sections disposed on each side of the main section 42.

Moreover, as shown in FIGS. 1 and 2, the implement 10 may also include one or more harrows 48. As is generally understood, the harrows 48 may be configured to be pivotally coupled to the frame 20. The harrows 48 may include a plurality of ground engaging tools 50, such as tines or spikes, which are configured to level or otherwise flatten any windrows or ridges in the soil created by the cultivator 36. Specifically, the ground engaging elements 50 may be configured to be pulled through the soil as the implement 10 moves across the field in the direction of travel 14. It should be appreciated that the implement 10 may include any suitable number of harrows 48. In fact, some embodiments of the implement 10 may not include any harrows 48.

Moreover, in one embodiment, the implement 10 may optionally include one or more baskets or rotary firming wheels 52. As is generally understood, the baskets 52 may be configured to reduce the number of clods in the soil and/or firm the soil over which the implement 10 travels. As shown, each basket 52 may be configured to be pivotally coupled to one of the harrows 48. Alternately, the baskets 52 may be configured to be pivotally coupled to the frame 20 or any other suitable location of the implement 10. It should be appreciated that the implement 10 may include any suitable number of baskets 52. In fact, some embodiments of the implement 10 may not include any baskets 52.

It should be appreciated that the configuration of the implement 10 described above and shown in FIGS. 1 and 2 is provided only to place the present subject matter in an exemplary field of use. Thus, it should be appreciated that the present subject matter may be readily adaptable to any manner of implement configuration.

Figure 3:
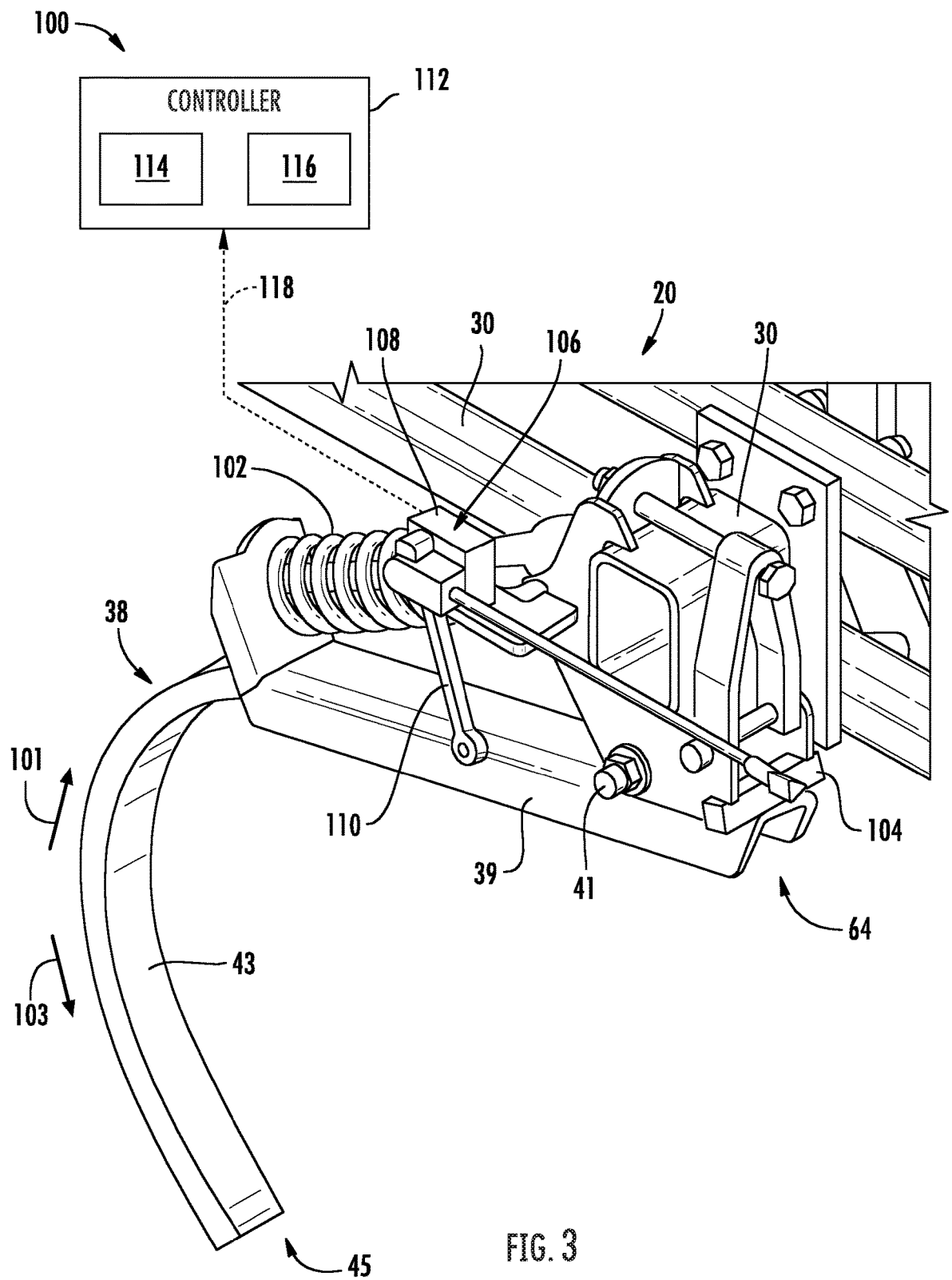
FIG. 3 illustrates a perspective view of one embodiment of a system for monitoring the displacement of a ground engaging tool of an agricultural implement in accordance with aspects of the present subject matter, particularly illustrating the system including a sensor for detecting a parameter indicative of a current position of a ground engaging tool relative to a frame.

Referring now to FIG. 3, a side view of one embodiment of a system 100 for monitoring the displacement of a ground engaging tool of an agricultural implement is illustrated in accordance with aspects of the present subject matter. In general, the system 100 will be described herein with reference to the implement 10 and one of the ground engaging tools 38 described above with reference to FIGS. 1 and 2. However, it should be appreciated by those of ordinary skill in the art that the disclosed system 100 may generally be utilized with ground engaging tools having any other suitable ground engaging tool configuration and/or implements having any other suitable implement configuration.

As shown in FIG. 3, the system 100 may include a ground engaging tool 38 pivotally coupled to the implement frame 20. More specifically, the ground engaging tool 38 may generally include a shank portion 39 configured to be pivotally coupled to the frame 20 (e.g., at pivot point 41) and a ground-engaging portion 43 extending from the shank portion 39 along a curved or arcuate profile. As shown in FIG. 3, the ground-engaging portion 43 may include a tip end 45 that is configured to penetrate into or otherwise engage the ground as the implement 10 is being pulled through the field. In one embodiment, the ground engaging tool 38 may be configured as a chisel. However, one of ordinary skill in the art would appreciate that the ground engaging tool 38 may be configured as a sweep, tine, or any other suitable ground engaging tool.

The system 100 may also include a biasing element 102 coupled between the frame 20 and the ground engaging tool 38. In this respect, the biasing element 102 may be configured to bias the ground engaging tool 38 to a predetermined ground engaging tool position (e.g., a home or base position) relative to the frame 20. In general, the predetermined ground engaging tool position may correspond to a ground engaging tool position in which the ground engaging tool 38 penetrates the soil to a desired depth. In several embodiments, the predetermined ground engaging tool position may be set by a mechanical stop 104. In operation, the biasing element 102 may permit relative movement between the ground engaging tool 36 and the frame 20. For example, the biasing element 102 may be configured to bias the ground engaging tool 38 to pivot relative to the frame 20 in a first pivot direction (e.g., as indicated by arrow 103 in FIG. 3) until an end 64 of the shank portion 39 of the ground engaging tool 38 contacts the stop 104. The biasing element 102 may also allow the ground engaging tool 38 to pivot away from the predetermined ground engaging tool position (e.g., to a shallower depth of penetration), such as in a second pivot direction (e.g., as indicated by arrow 101 in FIG. 3) opposite the first pivot direction 101, when encountering rocks or other impediments in the field. As shown in FIG. 3, the biasing element 102 may be configured as a spring. As will be discussed, however, the biasing element 102 may be configured as an actuator or any other suitable biasing element.

In accordance with aspects of the present subject matter, the system 100 may also include a sensor 106 provided in operative association with the ground engaging tool 38 or the biasing element 102. In general, the sensor 106 may be configured to detect an operating parameter indicative of a current position of the ground engaging tool 38 relative to the frame 20. In several embodiments, the sensor 106 may generally correspond to any suitable sensor(s) or sensing device(s) that is configured to directly or indirectly detect the pivotal motion of the ground engaging tool 38. For example, the sensor 106 may be configured as a rotary sensor 108 (e.g., a rotary potentiometer or a magnetic rotary sensor) coupled to one of the frame 20 or the ground engaging tool 38 and an associated sensor linkage 110 coupled between the rotary sensor 108 and the other adjacent component. For instance, as shown in the illustrated embodiment, the rotary sensor 108 is coupled to a portion of the frame 20, with the sensor linkage 110 being coupled between the rotary sensor 108 and the ground engaging tool 38. As such, when the ground engaging tool 38 pivots relative to the frame 20, the motion of the ground engaging tool 38 may be detected by the rotary sensor 108 via the mechanical linkage provided by the sensor linkage 110.

In other embodiments, the sensor 106 may correspond to any other suitable sensor(s) or sensing device(s) configured to detect the pivotal motion of the ground engaging tool 38. For instance, the sensor 106 may correspond to a linear potentiometer, a proximity sensor, and/or any other suitable transducer (e.g., ultrasonic, electromagnetic, infrared, etc.) that allows the pivotal motion of the ground engaging tool 38 relative to the frame 20 to be directly or indirectly detected.

As indicated above, FIG. 3 simply illustrates a single ground engaging tool 38 of the implement 10, with the biasing element 102 being coupled between the frame 20 and the illustrated ground engaging tool 38 and the sensor 106 being provided to monitor the displacement or pivotal motion of such ground engaging tool 38. However, a person of ordinary skill in the art will appreciate that any or all of the remaining ground engaging tools 38 of the disclosed implement 10 may similarly be provided in operative association with a corresponding biasing element 102 and an associated sensor 106. For example, in a particular embodiment of the present subject matter, each ground engaging tool 38 of the implement 10 may be provided in operative association with a biasing element/sensor, thereby allowing each tool position to be independently monitored relative to its predetermined ground engaging tool position. Alternatively, the displacement of groups or gangs of ground engaging tools 38 may be monitored collectively via a common sensor(s) 106.

Referring still to FIG. 3, the system 100 may further include a controller 112 configured to electronically control the operation of one or more components of the implement 10 or the work vehicle 12. In general, the controller 112 may comprise any suitable processor-based device known in the art, such as a computing device or any suitable combination of computing devices. Thus, in several embodiments, the controller 112 may include one or more processor(s) 114 and associated memory device(s) 116 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 116 of the controller 112 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 116 may generally be configured to store suitable computer-readable instructions that, when implemented by the processor(s) 114, configure the controller 112 to perform various computer-implemented functions, such as one or more aspects of the methods 200, 300, and 400 described below with reference to FIGS. 11 through 13. In addition, the controller 112 may also include various other suitable components, such as a communications circuit or module, one or more input/output channels, a data/control bus and/or the like.

It should be appreciated that the controller 112 may correspond to an existing controller of the implement 10 or the work vehicle 12 or the controller 112 may correspond to a separate processing device. For instance, in one embodiment, the controller 112 may form all or part of a separate plug-in module that may be installed within the implement 10 or the work vehicle 12 to allow for the disclosed system and method to be implemented without requiring additional software to be uploaded onto existing control devices of the implement 10 or the work vehicle 12.

Figure 4:
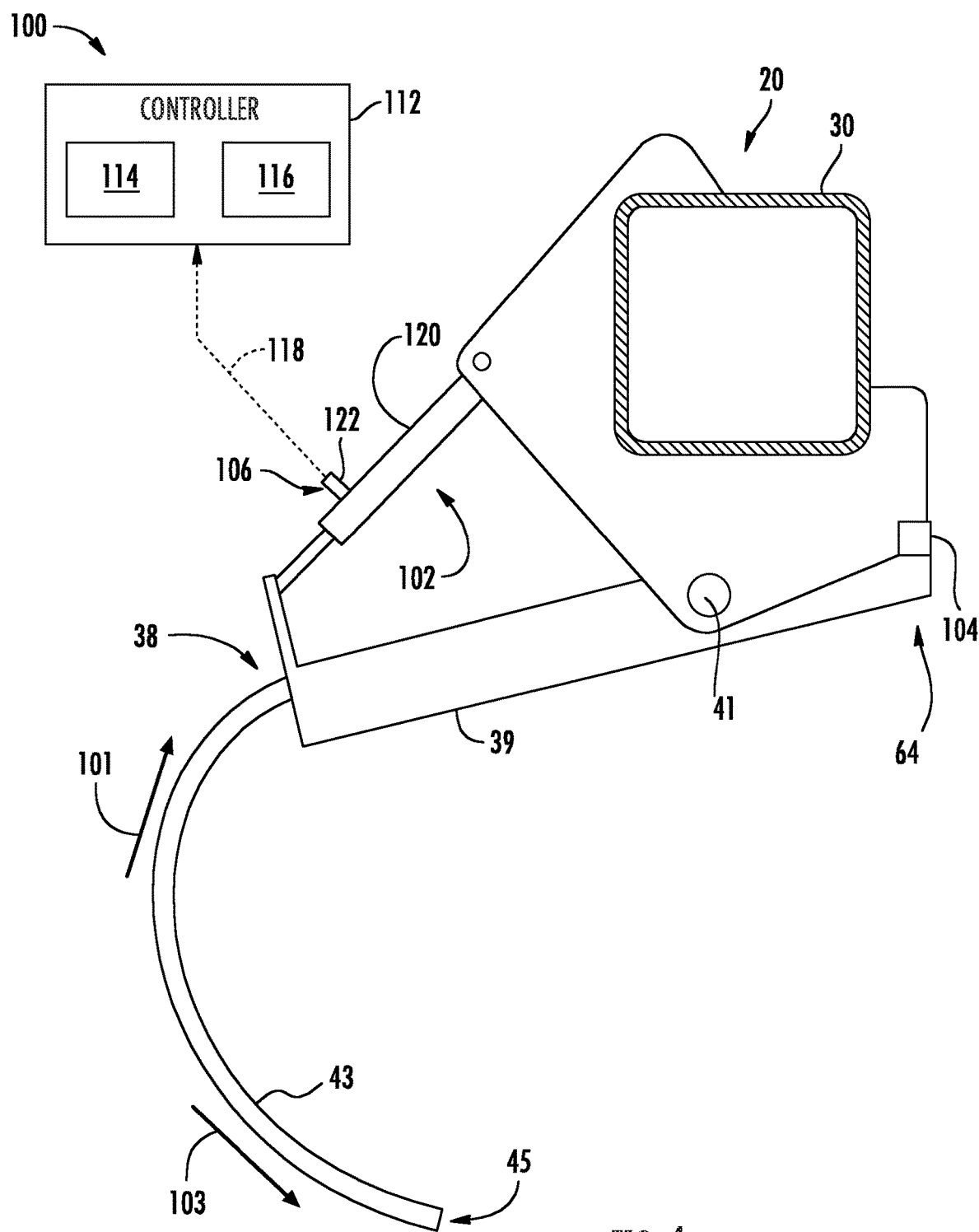
FIG. 4 illustrates a perspective view of another embodiment of a system for monitoring the displacement of a ground engaging tool of an agricultural implement in accordance with aspects of the present subject matter, particularly illustrating the system including a fluid-driven actuator for adjusting a down pressure exerted on a ground engaging tool.

Referring now to FIG. 4, a side view of another embodiment of the system 100 described above with reference to FIG. 3 is illustrated in accordance with aspects of the present subject matter. As shown, the system 100 may generally be configured the same as or similar to that described above with reference to FIG. 3. For instance, the system 100 may include the biasing element 102 coupled between the frame 20 and the ground engaging tool 38, with the biasing element 102 being configured to bias the ground engaging tool 38 to the predetermined ground engaging tool position relative to the frame 20. However, as shown in FIG. 4, unlike the above-described embodiment, the biasing element 102 may be configured as a fluid-driven actuator 120, such as hydraulic actuator and/or a pneumatic actuator. Specifically, in one embodiment, the actuator 120 may be configured to adjust a down pressure exerted on the ground engaging tool 38 based on a fluid pressure associated with the fluid-driven actuator. It should be appreciated that, in alternate embodiments, the biasing element 102 may be a solenoid, a linear actuator, or any other suitable type of actuator.

Similar to the embodiment described above with reference to FIG. 3, the system 100 may include a sensor 106 configured to monitor an operating parameter indicative of a current position of the ground engaging tool 38 relative to the frame 20. However, as shown in FIG. 4, unlike the above-described embodiment, the sensor 106 may be configured as a pressure sensor 122 provided in operative association with the fluid-driven actuator 120. In general, the pressure sensor 122 may be configured to detect or measure a pressure of a fluid supplied within the actuator 120. For example, in one embodiment, the pressure sensor 122 may be provided in fluid communication with a fluid chamber defined within the actuator 120 (e.g., a piston-side chamber or a rod-side chamber of the actuator 120). Alternatively, the pressure sensor 122 may be installed at any other suitable location that allows the pressure sensor 122 to measure the pressure of the fluid supplied within the actuator 120, such as by installing the pressure sensor 122 in fluid communication with a hose or conduit configured to supply fluid to the actuator 120. The pressure of the fluid supplied within the actuator 120 may, in turn, be indicative of the current position of the ground engaging tool 38 relative to the frame 20. In this respect, the controller 112 may include a look-up table or suitable mathematical formula stored within its memory 116 that correlates the pressure measurements to the current position of the ground engaging tool 38.

Figure 5:
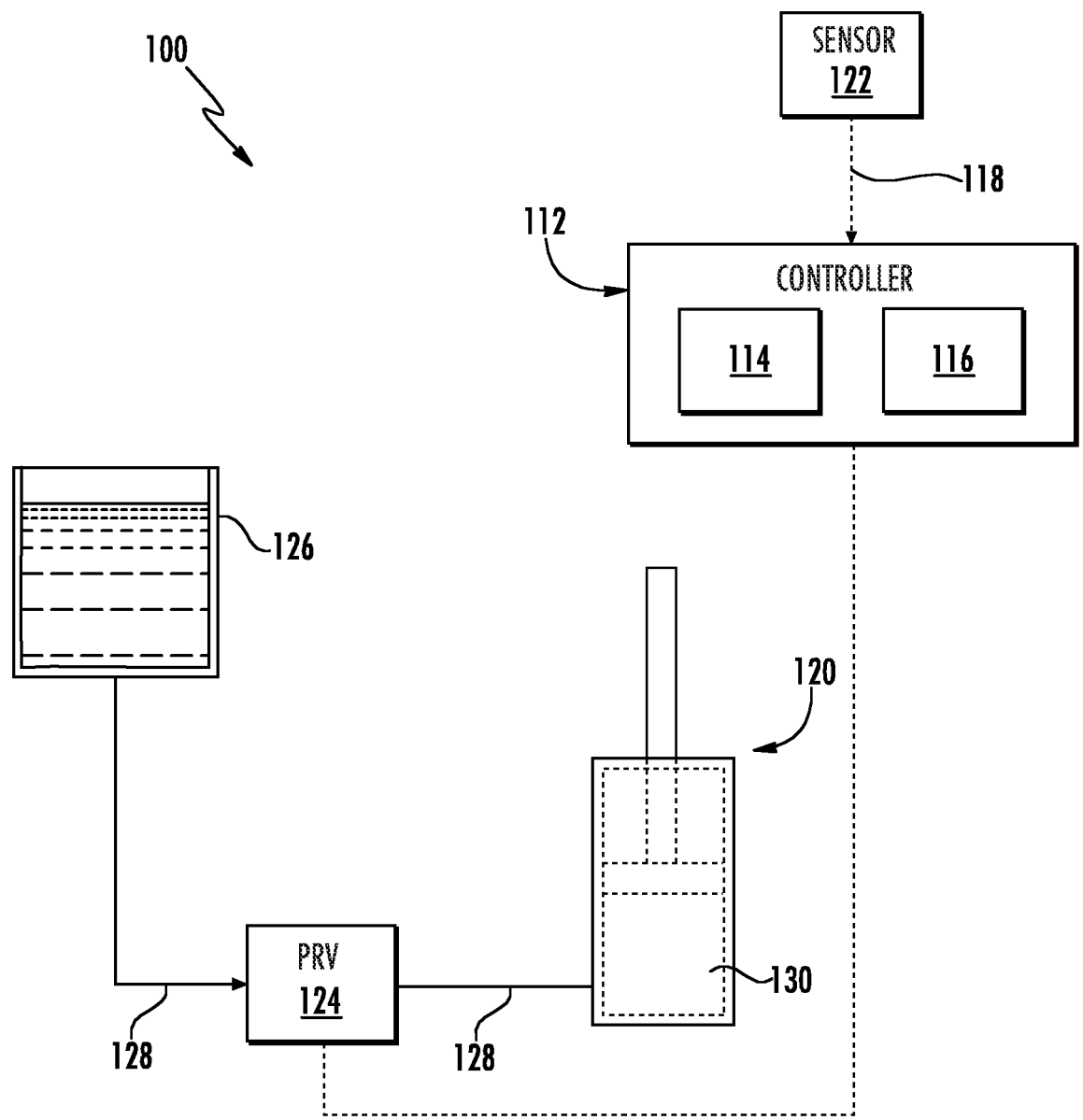
FIG. 5 illustrates a schematic view of another embodiment of a system for monitoring the displacement of a ground engaging tool of an agricultural implement in accordance with aspects of the present subject matter.
Figure 6:
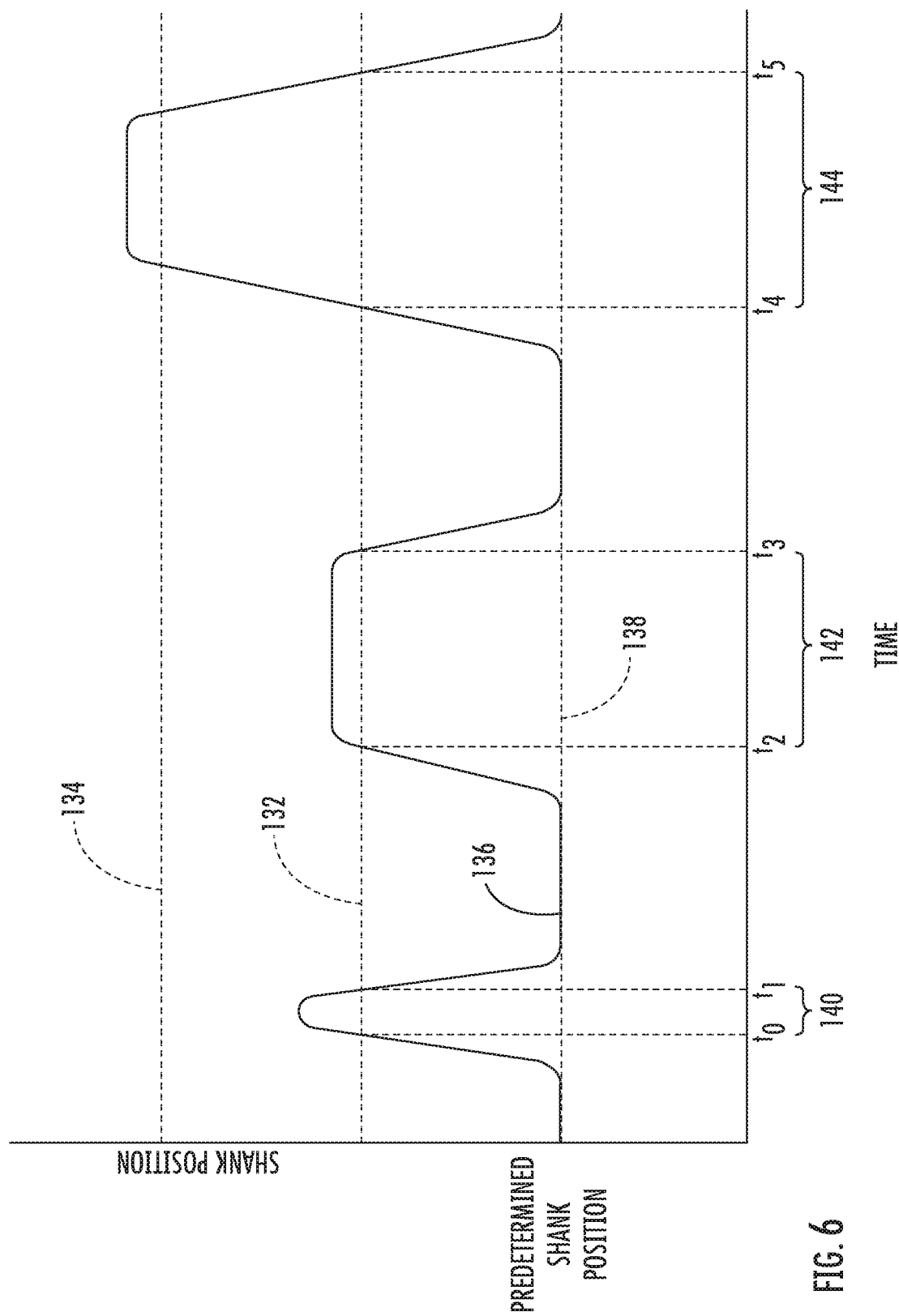
FIG. 6 illustrates a graphical view of an example dataset charting the displacement of a ground engaging tool relative a predetermined ground engaging tool position over time in accordance with aspects of the present subject matter.

Referring now to FIG. 5, a schematic diagram of a specific implementation of the system 100 described above with reference to FIG. 4 is illustrated in accordance with aspects of the present subject matter. It should be appreciated that, in the illustrated embodiment, the actuator 120 corresponds to a hydraulic cylinder. However, as indicated above, the actuator 120 also correspond to any other suitable fluid-driven actuator, such as a pneumatic actuator.

As shown in FIG. 5, the controller 112 may, in several embodiments, be configured to be coupled to suitable components for automatically controlling the operation of the actuator 120, thereby allowing the controller 112 to actively adjust the adjust the down pressure exerted on the ground engaging tool 38. For example, in the illustrated embodiment, the controller 112 may be communicatively coupled to a suitable pressure regulating valve 124 (PRV) (e.g., a solenoid-activated valve) configured to regulate the pressure of hydraulic fluid supplied to the actuator 120 (e.g., from a hydraulic fluid tank 126 or pump of the implement 10 or the work vehicle 12 via one or more fluid conduits 128). Specifically, as shown schematically in FIG. 5, the controller 112 may be coupled to the PRV 124 so as to regulate the pressure of the hydraulic fluid supplied, to a cap or piston end 130 of the actuator 120 (e.g., via one or more conduits 128). In such an embodiment, the pressure of the fluid supplied from the PRV 124 may be directly proportional to the pressure supplied at the piston end 130 of the actuator 120, thereby allowing the controller 112 to control the displacement of the actuator 120. It should be appreciated that, although FIG. 5 only illustrates the controller 112 coupled to a single PRV for controlling the operation of the actuator 120 for one of the ground engaging tools 38, similar hydraulic components may be utilized to control the corresponding actuators 120 associated with the remaining ground engaging tools 38 of the implement 10.

Although the sensor 106 is described above as being configured as a rotary sensor 108 (FIG. 3) or a pressure sensor 120 (FIG. 5), a person of ordinary skill in the art would appreciate that the sensor 108 may be any suitable sensor(s) or sensing device(s) configured to detect an operating parameter indicative of the current position of the ground engaging tool 38 relative to the frame 20. For example, the sensor 106 may be configured as an accelerometer coupled to the ground engaging tool 38. As such, when the ground engaging tool 38 pivots relative to the frame 20, the acceleration of the ground engaging tool 38 relative to the frame 20 may be detected by the accelerometer. The acceleration of the ground engaging tool 38 may, in turn, be indicative of the current position of the ground engaging tool 38 relative to the frame 20. For example, the controller 112 may be configured to determine the current position of the ground engaging tool 38 based on a duration of the detected acceleration. In this respect, the controller 112 may include a look-up table or suitable mathematical formula stored within its memory 116 that correlates the acceleration measurements to the current position of the ground engaging tool 38.

In several embodiments, the controller 112 may be configured to monitor a current position of one or more of the ground engaging tool(s) 38 relative to the frame 20. Specifically, the controller 112 may be communicatively coupled to the sensor 106($s$), such as the rotary sensor 108($s$), via a wired or wireless connection to allow measurement signals (e.g., indicated by dashed line 118 in FIG. 3) to be transmitted from the sensor(s) 106 to the controller 112. The controller 112 may then be configured determine or estimate the current position(s) of the ground engaging tool(s) 38 relative to the frame 20 based on the measurement signals 118 received from the sensor(s) 106. For instance, the controller 112 may include a look-up table or suitable mathematical formula stored within its memory 116 that correlates the sensor measurements to the current position of the ground engaging tool(s) 38.

By monitoring the current position of the one or more ground engaging tools 38 relative to the frame 20, the controller 112 may be configured to monitor the magnitude of the displacement(s) of the ground engaging tools 38 relative to the predetermined ground engaging tool position(s). For instance, the controller 112 may be configured to determine the magnitude(s) of the displacement(s) of the ground engaging tool(s) 38 relative to its predetermined ground engaging tool position(s) by comparing the current position(s) of the ground engaging tool(s) 38 to the predetermined ground engaging tool position(s).

In accordance with aspects of the present subject matter, by monitoring the magnitude of the displacement of the one or more ground engaging tools 38, the controller 112 may be configured to compare the determined displacement value(s) to one or more predetermined threshold displacement values. Specifically, in several embodiments, the controller 112 may be configured to compare the determined displacement value(s) to both a first threshold displacement value and a second threshold displacement value. In general, the second threshold displacement value 134 may correspond to a greater displacement from the predetermined ground engaging tool position than the first threshold displacement value 134. As such, the first and second threshold displacement values may provide an indication of the relative magnitude of the determined displacement value for the ground engaging tool(s) 38. For example, in one embodiment, the controller 112 may be configured to recognize displacement values that fall below the first threshold displacement value as being within a desired or acceptable operating range for the ground engaging tool(s). In contrast, when the determined displacement(s) has exceeded the first threshold displacement value but still remains below the second threshold displacement value, the controller 112 may be configured to associate such displacement(s) as having a "moderate" or medium level magnitude. Conversely, when the determined displacement(s) has exceeded both of the threshold displacement values, the controller 112 may be configured to associate such displacement as having a "high" magnitude. As such, the controller 112 may recognize not only when the monitored tool displacement(s) has exceeded the desired or acceptable operating range, but also recognize differing levels or varying degrees of tool displacement values outside such operating range. In such embodiments, as will be described below, the controller 112 may, for example, be configured to initiate separate or different control actions based on the degree to which the monitored tool displacement value(s) has exceeded the desired operating range. It should be appreciated that, although the embodiments disclosed herein will generally be described with reference to comparing the monitored tool displacement value(s) to two separate threshold values, the controller 112 may, in alternative embodiments, be configured to compare the determined displacement to any other suitable number of threshold displacement values, such as a single threshold displacement value or three or more threshold displacement values.

FIG. 4 illustrates a graphical view of an example dataset charting the displacement of one of the ground engaging tools 38 of the implement 10 (e.g., as indicated by solid line 136) relative to both the tool's predetermined ground engaging tool position (e.g., as indicated by dashed line 138) and first and second threshold displacement values set for the tool 38 (e.g., as indicated by lines 132, 134, respectively) over time as monitored by the controller 112. As shown in FIG. 4, during various different time periods, the ground engaging tool 38 is displaced from its predetermined ground engaging tool position 138, such as at a first time period 140 between time $t_0$ and time $t_1$, a second time period 142 between time $t_2$ and time $t_3$, and a third time period 144 between time $t_4$ and $t_5$. In such instances, the controller 112 may be configured to determine the displacement of the ground engaging tool 38 during each time period and compare it to the first and second threshold displacement values 132, 134. In the event that the displacement of the ground engaging tool 38 exceeds the first and/or second threshold displacement values 132, 134 during such time periods, the controller 112 may be configured to identify the relevant severity level of such displacement event. For instance, in the example dataset of FIG. 4, the displacements of the ground engaging tool 38 during the first and second time periods 140, 142 exceed the first threshold displacement value 132, but remain below the second threshold displacement value 134. In such instance, the displacement occurring across the first and second time periods 140, 142 may be indicative of a "moderate" severity level or a moderate degree of tool displacement, such as when the ground engaging tool 38 moves away from its predetermined ground engaging tool position to an extent that only impacts an associated tillage output of the implement (e.g., the seedbed quality) to a first degree (e.g., a minimal or moderate impact to the tillage output). In contrast, the displacement occurring across third time period 144 exceeds both of the first and second threshold displacement values 132, 134 and may be indicative of the "high" severity level or a high degree of tool displacement, such as when the ground engaging tool 38 moves away from its predetermined ground engaging tool position to an extent that impacts the associated tillage output of the implement (e.g., the seedbed quality) to a higher degree (e.g., a substantial impact to the tillage output).

It should be appreciated that, in addition to utilizing a magnitude-based displacement threshold, the controller 112 may also be configured to identify a time period across which the magnitude(s) of the displacement(s) of the ground engaging tool(s) 38 exceeds the first and/or second threshold displacement values 132, 134 during operation of the implement 10. Specifically, the controller 112 may be configured to identify the length of each time period and compare it to a given threshold time period. In the event that the length of any of such time periods exceeds the threshold time period, the controller 112 may determine that a float event has occurred. For instance, in the example dataset of FIG. 4, it may be assumed that the first time period 140 is less than the threshold time period while the second and third time periods 142, 144 exceed the threshold time period. In such instance, the tool displacement occurring across the first time period 140 may be indicative of a short, non-float displacement event, such as a ground engaging tool trip event occurring when the ground engaging tool 38 contacts a rock with the field and quickly pivots away from and back to its predetermined ground engaging tool position 138. In contrast, the tool displacement occurring across the second and third time periods 142, 144 may be indicative of a more prolonged displacement event, such as when the ground engaging tool 38 floats away from the predetermined ground engaging tool position 138 for an extended period of time due to compacted or hardened soil conditions or a change in the operating state of the implement (e.g., a change in the levelness of the frame or a substantial change in the time pressure associated with one of the wheels).

Referring back to FIG. 3, when it is determined that the displacement(s) of the ground engaging tool(s) 38 has varied to any extent and/or has exceeded one of the predetermined threshold displacement values (e.g. the first and/or second threshold displacement values 132, 134), the controller 112 may be configured to initiate a control action associated with notifying the operator of the change in the monitored tool displacement(s) and/or a control action associated with adjusting the monitored tool displacement value(s). For instance, in one embodiment, the controller 112 may be configured to transmit a notification to the operator of the implement 10 (e.g., by causing a visual or audible notification or indicator to be presented to the operator within the work vehicle 12) that provides an indication that the displacement(s) of the ground engaging tool(s) has changed by a given amount, such as a visual indication that the displacement(s) has exceeded the first and/or second threshold displacement values 132, 134. In such instances, the operator may then choose to initiate any suitable corrective action he/she believes is necessary, such as by adjusting the ground speed of the implement 10 and/or adjusting the down pressure being applied to the relevant ground engaging tool(s). As will be described below, such operator notifications may be presented in the form of a user interface that includes one or more interface elements that can be varied and/or updated with changes in the monitored tool displacement.

Referring now to FIGS. 7 through 10, various example views of one embodiment of a suitable graphical user interface (GUI) 146 that may be presented within a corresponding display device for providing an operator with a visual indicator associated with the monitored tool displacements of the various ground engaging tools of an implement are illustrated in accordance with aspects of the present subject matter. As indicated above, the controller 112 may be configured to provide notifications to the operator indicating when the magnitude(s) of the displacement(s) of the ground engaging tool(s) 38 has changed, such as when the monitored displacement value(s) has exceeded the first and/or second threshold displacement values 132, 134. In this regard, the GUI 146 may include various interface elements or objects that are configured to provide to serve as visual indicators of the displacement values of the various ground engaging tools 38 and/or of a tillage output(s) that vary as a function of the tool displacement (e.g., seedbed quality). For instance, as shown in FIGS. 7 through 10, the GUI 146 may include a visual representation or image 148 of an implement as well as various visual indicators (e.g., numerical indicators 150, 152, 154, 155 and graphical indicators 156, 158, 160). As shown, the implement image 148 depicts the various sections 42, 44, 46 of the implement 10 and their associated ground engaging tools 38. In this regard, the numerical indicator 150 and the graphical indicator 156 are associated with providing an indication of the tool displacement/tillage output of the first or left wing section 44 of the implement 10, the numerical indicator 152 and the graphical indicator 158 are associated with providing an indication of the tool displacement/tillage output of the center section 42 of the implement 10, and the numerical indicator 154 and the graphical indicator 160 are associated with providing an indication of the tool displacement/tillage output of the second or right wing section 46 of the implement 10. Moreover, the numerical indicator 155 is associated with providing an indication of the overall tool displacement/tillage output of the implement (e.g., an average value of the tool displacement/tillage output for the entire implement 10 across all of its sections 42, 44, 46). However, it should be appreciated that the GUI 146 may have any other suitable configuration and/or may include any other suitable interface elements.

Furthermore, it should be appreciated that the system 100 may include any other suitable user interface configured to provide notifications to the operator of the implement 10. For example, the system 100 may include various lights or indicator lamps (e.g., green, yellow, and/or red lights) or various alarms.

Figure 7:
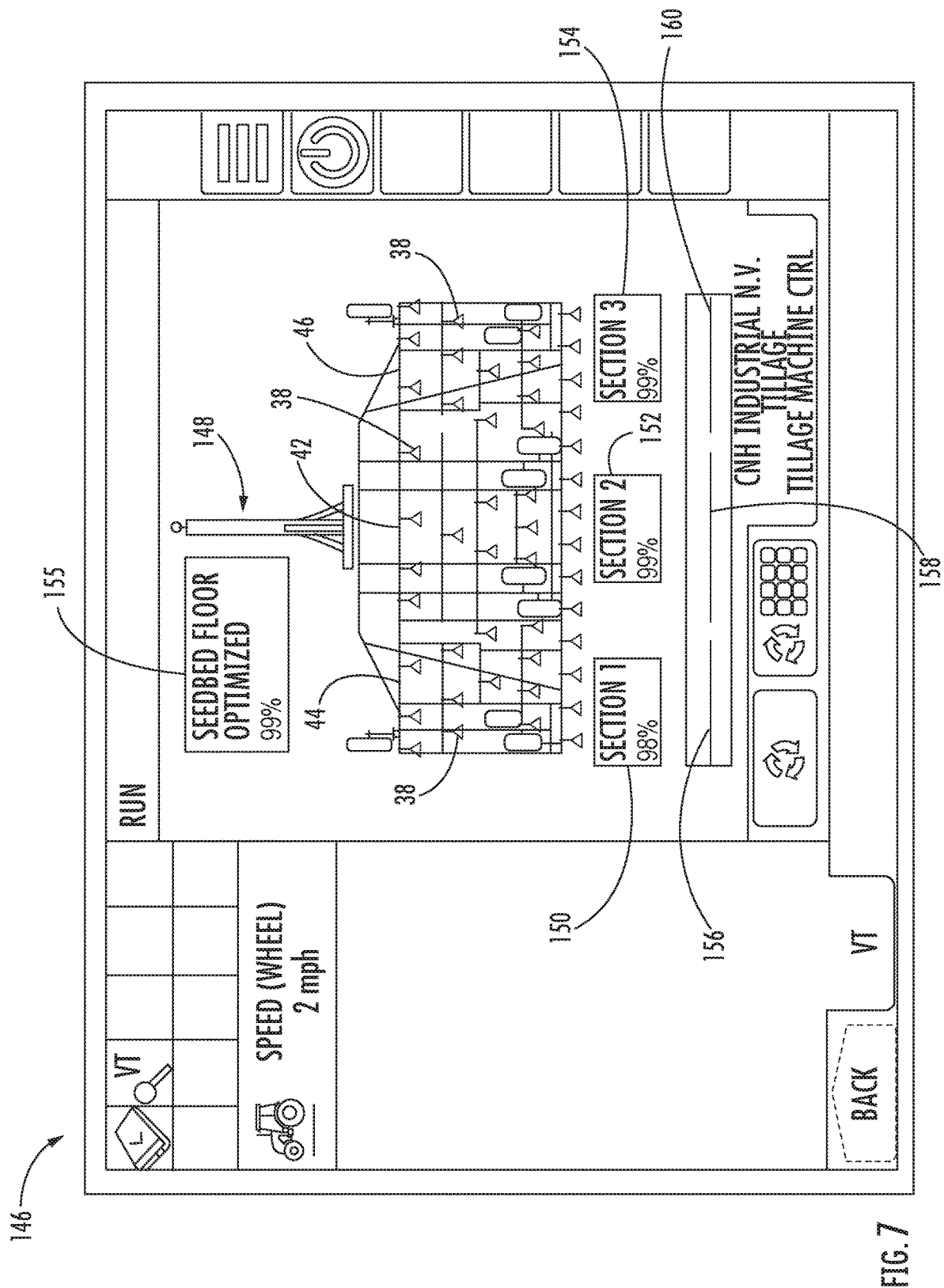
FIG. 7 illustrates an example view of graphical user interface that may be displayed to an operator of an agricultural implement for providing the operator with a visual indicator associated with the monitored displacement of the ground engaging tools of the implement in accordance with aspects of the present subject matter, particularly illustrating interface elements of the user interface providing an indication that the displacements of the various ground engaging tools are currently within a desired operating range (e.g., below a first threshold displacement value)

As indicated above, in accordance with aspects of the present subject matter, the various interface elements may be configured to provide the operator with a visual indication either directly or indirectly associated with the displacement values of the ground engaging tools 38. For instance, in the example image of the GUI 146 shown in FIG. 7, the various interface elements are providing a visual indication that the determined displacements of all of the ground engaging tools 38 installed on the implement 10 fall below the first and second threshold displacement values 132, 134 (i.e., the displacement values fall within a desired operating range) and/or that the associated tillage output falls within the desired operating range. In such instance, a visual parameter associated with the various interface elements may be selected so as to indicate to the operator that the monitored tool displacements and/or the monitored tillage output falls within the desired operating range. For example, in one embodiment, the interface elements may be displayed in a given color (e.g., green) when the monitored parameter falls within the desired operating range and, thus, is below the first threshold displacement value. In the illustrated embodiment of the user interface, such color is indicated with non-bold, solid line. For example, as shown in FIG. 7, all of the ground engaging tools 38 are displayed as non-bold, solid triangles. Similarly, all of the numerical values associated with the numerical indicators 150, 152, 154, 155 are displayed using non-bold, solid lines. Additionally, each of the graphical indicators 156,158, 160 is displayed as a non-bold, solid graph lines. It should be appreciated that, in the embodiments of the GUI 146 shown FIGS. 7 through 10, the user interface will include non-bold, solid triangles, numerical values, and/or lines to indicate that such interface elements are being displayed in a common color (e.g., green) indicative of operation within a desired operating range (e.g., when the associated tool displacement value(s) is below the first and second threshold displacement values 132, 134). However, as will be described below, the interface elements may be displayed in other colors to indicate vary degrees or levels of tool displacement value(s) across the implement 10 (e.g., when the displacement value(s) exceeds one or both of the threshold values), with such differing colors being indicated by a different line type within FIGS. 7 through 10 (e.g., bold or dashed lines). For example, in a particular embodiment, a first specific color (e.g., green) may be used to indicate that a given parameter is within a desired range, a second specific color (e.g., yellow) may be used to indicate that such parameter is outside the desired range, but not yet to a significant level (e.g., when the monitored tool displacement has exceeded the first threshold displacement value, but not yet exceed the second threshold displacement value), and a third specific color (e.g., red) may be used to indicate that such parameter is outside the desired range by a significant amount (e.g., when the monitored tool displacement has exceeded the both threshold values).

In addition to varying the color of one or more of the interface elements (or as an alternative thereto), the size, shape and/or profile of one or more of the interface elements may also be varied to indicate the differing degrees of levels of tool displacement value(s) across the implement 10. For example, in one embodiment, the shape and/or profile of the graph line associated with each graphical indicator 156, 158, 160 may be varied based on the degree of tool displacement. Specifically, as shown in FIG. 7, in one embodiment, the graphical indicator 156, 158, 160 may correspond to straight or flat graph lines when the tool displacement value(s) associated with a given frame section 42, 44, 46 fall within the desired operating range (e.g., when an average of the displacement values for the ground engaging tools supported by a given section fall within the desired range). However, as will be described below, in the event that the tool displacement value(s) associated with a given frame section 42, 44, 46, exceed one or both of the threshold values (e.g., when an average of the displacement values for the ground engaging tools supported by a given section exceed one or both of the threshold values), the associated graphical indicator 156, 158, 160 may be displayed as a non-flat or undulating, wavy profile. In such an embodiment, the amplitude of the wavy profile may vary depending on whether the associated tool displacement value(s) only exceed the first threshold value or exceed both the first and second threshold values.

Moreover, in addition to varying the color, size, shape, and/or profile of one or more of the interface elements (or as an alternative thereto), the controller 112 may be configured to vary the specific numerical value associated with each numerical indicator 150, 152, 154, 155. For example, in one embodiment, the numerical value associated with each numerical indicator 150, 152, 154, 155 may correspond to a quality percentage value corresponding to the quality of a given tillage output parameter for each individual frame section 42, 44, 46 of the implement 10, such as an estimated quality of the seedbed being created by each frame section, with the percentage generally decreasing with decreasing quality of the tillage output parameter such that a percentage of 100% indicates the highest quality level and a percentage of less than 100% indicates a lower quality level 42, 44, 46 that decreases based on the amount to which the percentage varies from 100%. In such an embodiment, the numerical indicator 155 may provide a global or overall quality percentage value for the tillage output parameter that takes into account the various numerical values for the section-specific numerical indicators 150, 152, 154. In one embodiment, a first percentage range may be defined to indicate "good" quality value for the tillage output parameter (e.g., 96%-100%), a second percentage range may be defined to indicate a "medium" or mid-level quality value for the tillage output parameter (e.g., 92%-95%), and a third percentage range may be defined to indicate a "bad" or low-level quality value for the tillage output parameter (e.g., less than or equal to 91%).

In another embodiment, the numerical value associated with each numerical indicator 150, 152, 154 may correspond to a percent displacement value for the various ground engaging tools included within each frame section 42, 44, 46, with the percentage generally decreasing with increasing tool displacement such that a percentage of 100% indicates that the tools of a given frame section 42, 44, 46 are generally located at their home/base position and a percentage of less than 100% indicates that the tools of such frame section 42, 44, 46 are generally displaced away from their home/base position by a magnitude corresponding to the amount to which the percentage varies from 100%. In such an embodiment, the numerical indicator 155 may provide a global or overall percentage value for the implement 10 that takes into account the various numerical values for the section-specific numerical indicators 150, 152, 154.

Figure 8:
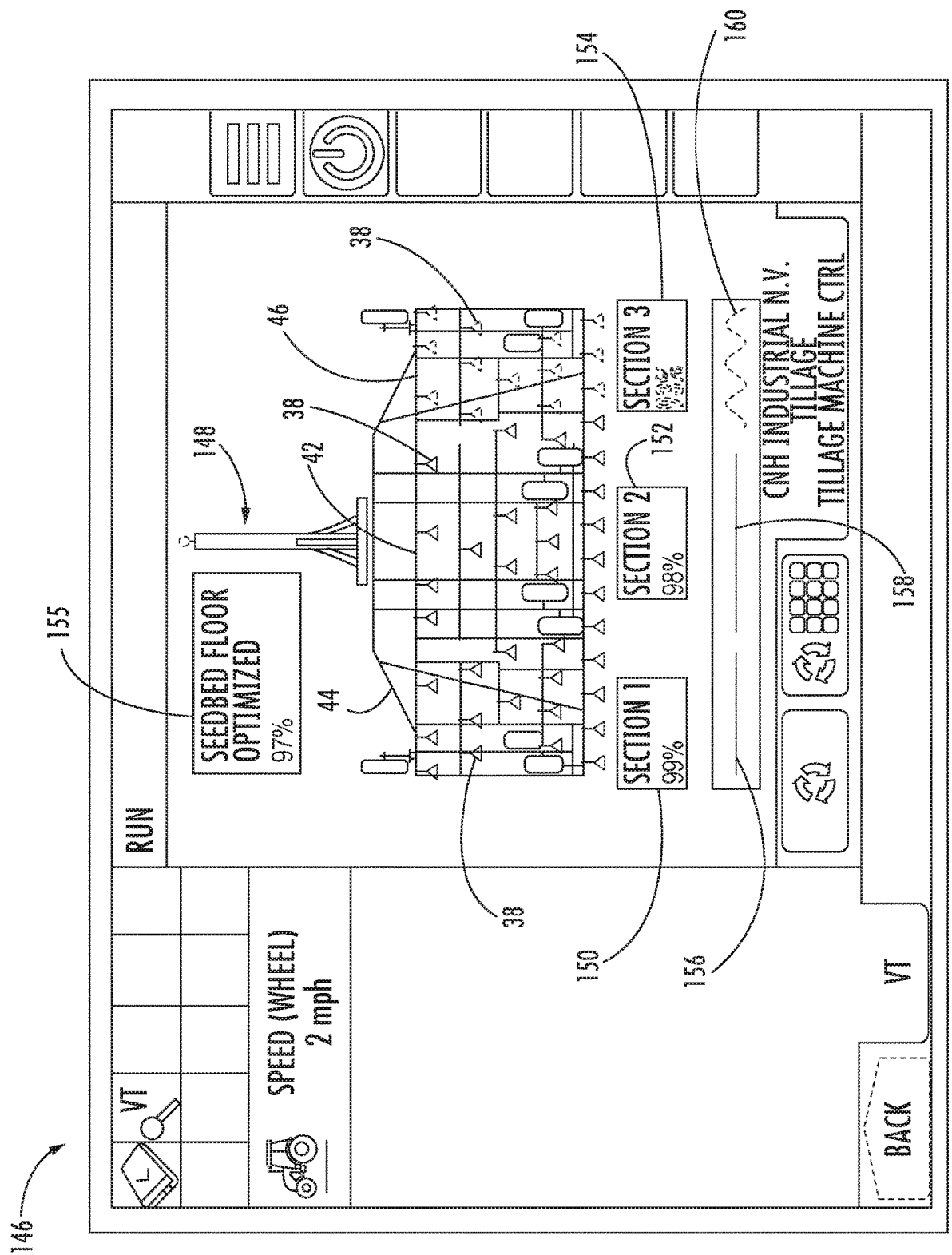
FIG. 8 illustrates another example view of a graphical user interface shown in FIG. 5 in accordance with aspects of the present subject matter, particularly illustrating the interface elements of the user interface providing an indication that the displacements of a portion of the ground-engaging tools (e.g., the tools positioned on a second or right wing section of the implement) are no longer within the desired operating range (e.g., by having displacements that have exceeded a first threshold displacement value and/or a second threshold displacement value associated with the tool displacements)

Referring now to FIG. 8, the GUI 146 is illustrated assuming that the monitored tool displacement values for a portion of the ground engaging tools 38 have changed from the values associated with the view of the GUI 146 shown in FIG. 7. Specifically, for purposes of discussion, it may be assumed that the monitored tool displacement value(s) for the ground engaging tools 38 positioned on the second or right wing section 46 of the implement 10 (e.g., an average displacement value for the tools or an individual displacement value for each tool) has exceeded the first threshold displacement value 132, but remains below the second threshold displacement value 134, while the monitored tool displacement value(s) for the ground engaging tools 38 positioned on both the center section 42 and the first wing section 44 still fall below the first and second threshold displacement values 132, 134. As such, in accordance with aspects of the present subject matter, the visual indicators of the GUI 146 may provide an indication that the displacement value(s) for the tools 38 of the second wing section 46 have fallen outside the desired operating range while the tools 38 of the remaining sections 42, 44 are still within such operating range. For example, as shown in FIG. 8, the visual indicators associated with the second wing section 46 (e.g., the triangles representing the tools of the wing section 46, the numerical value associated with the numerical indicator 154, and the graph line associated with the graphical indicator 160) are all displayed as non-bold, dashed lines (thereby indicating one specific color, such as yellow). In contrast, the visual indicators associated with the other frame sections 42, 44 (e.g., the triangles representing the tools of the frame sections 42, 44, the numerical values associated with the numerical indicators 150, 152, and the graph lines associated with the graphical indicators 156, 158) are all displayed as non-bold, solid lines (thereby indicating another specific color, such as green). Additionally, the graph line associated with the graphical indicator 160 for the second wing section 154 is displayed as a wavy line (thereby indicating that associated tool displacement value(s) falls outside the desired operating range), while the graph lines associated with the graphical indicators 156,158 for the other frame sections 44, 42 are displayed as straight or flat lines (thereby indicating that associated tool displacement value(s) fall within the desired operating range).

Figure 9:
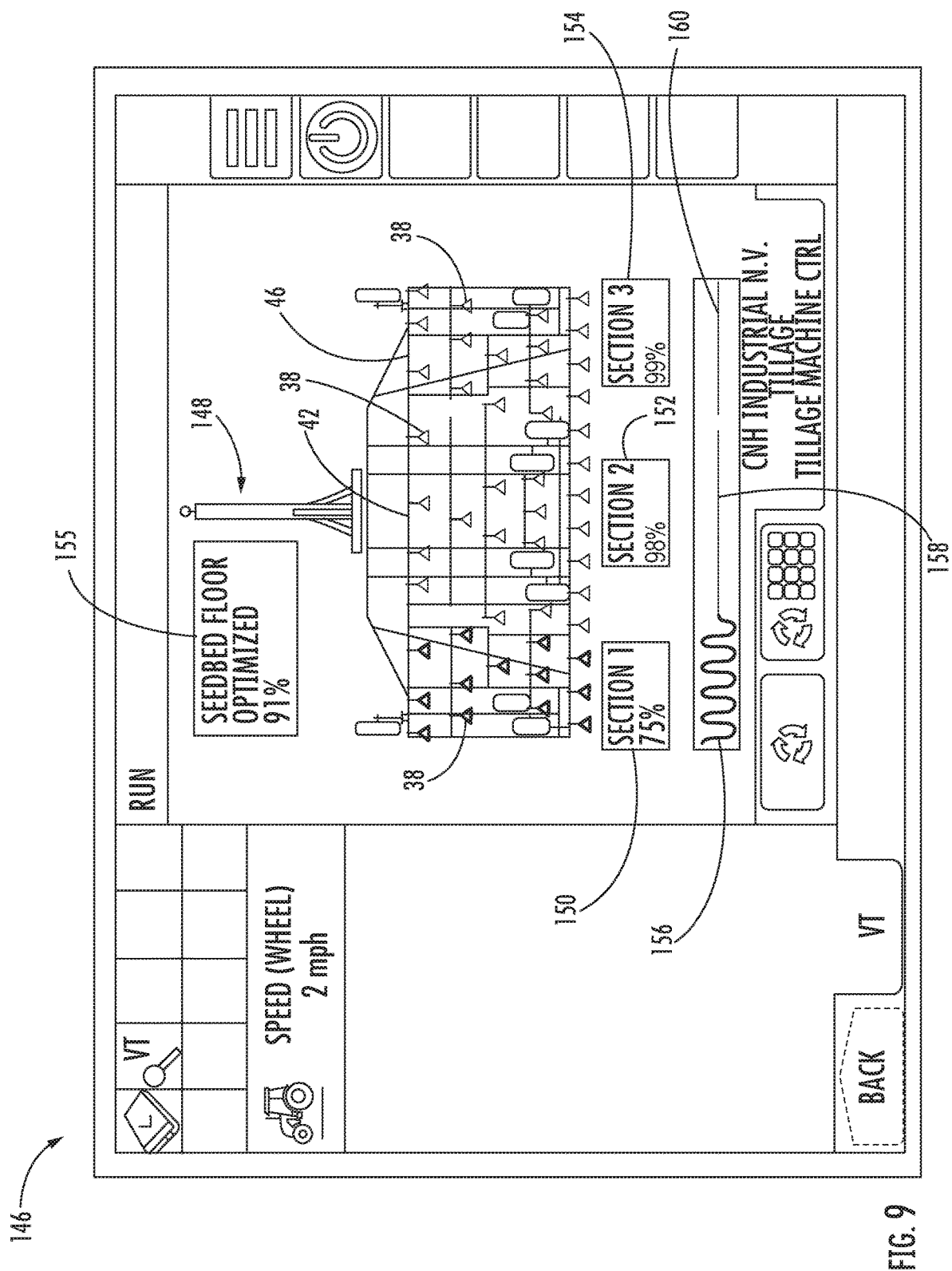
FIG. 9 illustrates yet another example graphical user interface shown in FIG. 5 in accordance with aspects of the present subject matter, particularly illustrating the interface elements of the user interface providing an indication that the displacements of a portion of the ground-engaging tools (e.g., the tools positioned on a first or left wing section of the implement) are no longer within the desired operating range (e.g., by having a displacements that have exceeded a first threshold displacement value and/or a second threshold displacement value associated with the tool displacements)

Referring now to FIG. 9, the GUI 146 is illustrated assuming that the monitored tool displacement values for a portion of the ground engaging tools 38 have changed from the values associated with the view of the GUI 146 shown in FIGS. 7 and 8. Specifically, for purposes of discussion, it may be assumed that the monitored tool displacement value(s) for the ground engaging tools 38 positioned on the first or left wing section 44 (e.g., an average displacement value for the tools or an individual displacement value for each tool) has exceeded both the first and second threshold displacement values 132, 134, while the monitored tool displacement value(s) for the ground engaging tools 38 positioned on both the center section 42 and the second wing section 46 still remain below the first and second threshold displacement values 132, 134. As such, in accordance with aspects of the present subject matter, the visual indicators of the GUI 146 may provide an indication that the displacement value(s) for the tools 38 of the first wing section 44 have fallen outside the desired operating range while the tools of the remaining sections 42, 46 are still within such operating range. For example, as shown in FIG. 9, the visual indicators associated with the first wing section 44 (e.g., the triangles representing the tools of the wing section 44, the numerical value associated with the numerical indicator 150, and the graph line associated with the graphical indicator 156) are all displayed as bold, solid lines triangles (thereby indicating one specific color, such as red). In contrast, the visual indicators associated with the other frame sections 42, 46 (e.g., the triangles representing the tools of the frame sections 42, 46, the numerical values associated with the numerical indicators 152, 154, and the graph lines associated with the graphical indicators 158, 156) are all displayed as non-bold, solid lines (thereby indicating another specific color, such as green) Additionally, the graph line associated with the graphical indicator 156 for the first wing section 44 is displayed as a wavy line (thereby indicating that associated tool displacement value(s) falls outside the desired operating range), while graph lines associated with the graphical indicators 158, 160 for the other frame sections 42, 46 are displayed as straight or flat lines (thereby indicating that associated tool displacement value(s) fall within the desired operating range). In such an embodiment, the wavy graph line of the graphical indicator 156 shown in FIG. 9 may, for example, have a greater amplitude than the wavy graph line of the graphical indicator 160 in FIG. 8, with the greater amplitude being indicative of the displacement value(s) of the corresponding ground engaging elements 38 having exceeded the second displacement threshold 134.

Figure 10:
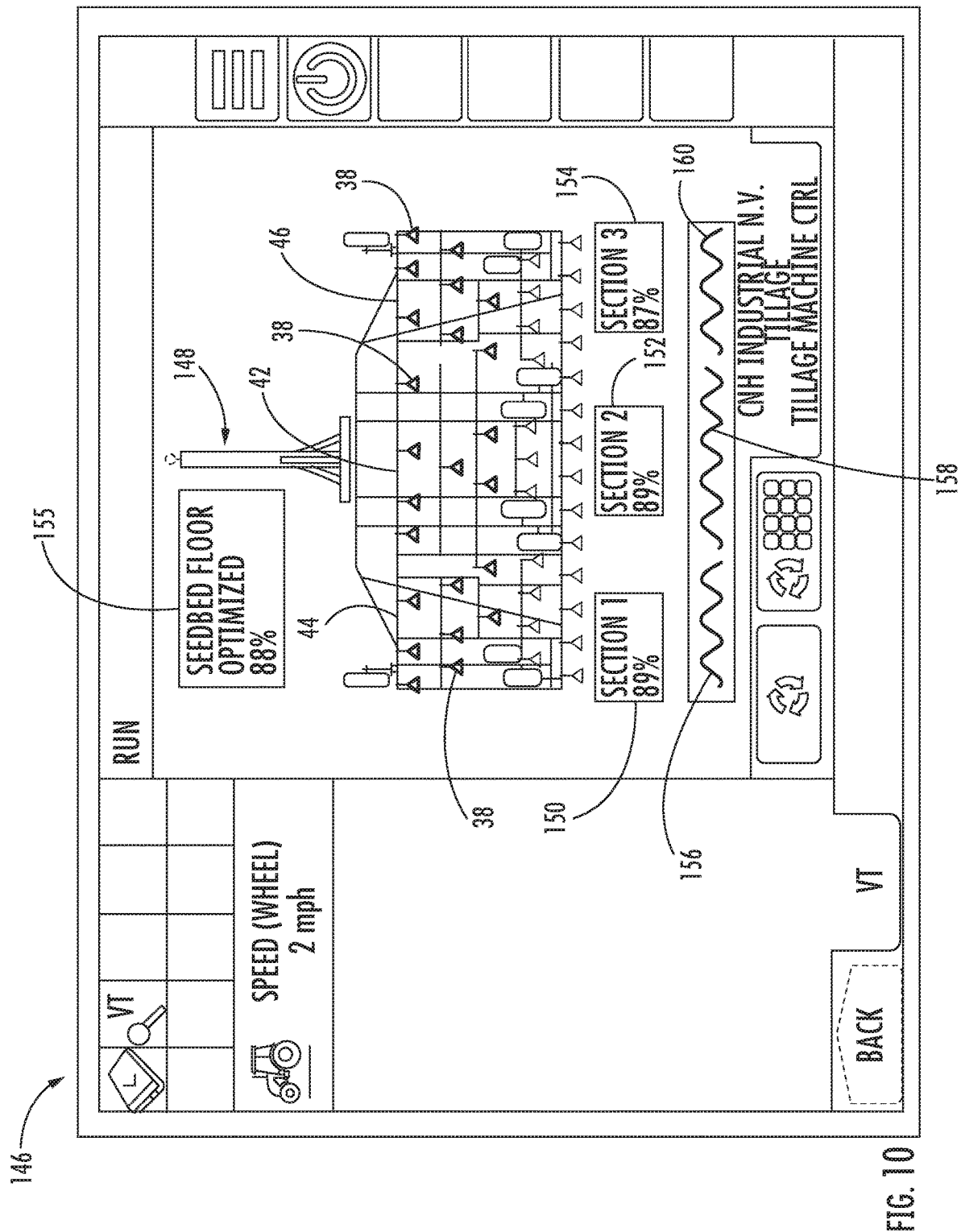
FIG. 10 illustrates a further example view of the graphical user interface shown in FIG. 5 in accordance with aspects of the present subject matter, particularly illustrating the interface elements of the user interface providing an indication that the displacements of a portion of the ground-engaging tools (e.g., the tools positioned at a forward end of the implement) are no longer within the desired operating range (e.g., by having displacements that have exceeded the first threshold displacement value and/or the second threshold displacement value associated with the tool displacements)

Referring now to FIG. 10, the GUI 146 is illustrated assuming that the monitored tool displacement values for the various the ground engaging tools 38 have changed from the values associated with the view of the GUI 146 shown in FIG. 7 through 9. Specifically, for purposes of discussion, it may be assumed that the monitored tool displacement value(s) for the ground engaging tools 38 positioned in a front or forward section of the implement 10 (e.g., the front three rows of tools) (e.g., an average displacement value for the tools or an individual displacement value for each tool) has exceeded both the first and second threshold displacement values 132, 134, while the monitored tool displacement value(s) for the ground engaging tools 38 positioned in an aft or rear section of the implement 10 (e.g., the rear two rows of tools) still remain below the first and second threshold displacement values 132, 134. As such, in accordance with aspects of the present subject matter, the visual indicators of the GUI 146 may provide an indication that the displacement value(s) for the tools 38 of the forward implement section have fallen outside the desired operating range while the tools 38 of the aft implement section are still within such operating range. For example, as shown in FIG. 10, the tools of the forward implement section are displayed as bold, solid triangles (thereby indicating one specific color, such as red), while the tools of the aft implement section are displayed as non-bold, solid triangles (thereby indicating another specific color, such as green). Moreover, the numerical values associated with the various numerical indicators 150, 152, 154 are all displayed using bold, solid lines (thereby indicating one specific color, such as red) while the graph lines of the graphical indicators 156, 158, 160 are all displayed as wavy lines, which may, in the illustrated example, indicate that average tool displacement values for the tools 38 within each frame section 42, 44, 46 have exceeded both the first and second threshold displacement values 132, 134.

Additionally, the controller 112 may be configured to generate a field map that visually identifies the displacements of the various ground engaging tools 38 across each portion of the field traversed by the implement 10. For instance, the field map may visually identify the portions of the field where the displacements of the ground engaging tools 38 fall below the first and second threshold displacement values 132, 134 (e.g., with a suitable color, such as green, or a suitable numerical value), the portions of the field where the displacements of the ground engaging tools 38 exceed the first threshold displacement value 132 but remain below the second threshold displacement value 134 (e.g., with a suitable color, such as yellow, or a suitable numerical value), and/or the portions of the field where the displacements of the ground engaging tools 38 exceed both the first and second threshold displacement values 132, 134 (e.g., with a suitable color, such as red, or a suitable numerical value). It should be appreciated that, in alternative embodiments, the field map may include any other suitable seedbed quality characteristics based on the monitored displacements of the ground engaging tools 38, such as the levelness of the seedbed. Furthermore, it should be appreciated that the field map may provide the operator with a visual indicator associated with the displacements of the various ground engaging tools 38 for all portions of the field traversed by the implement 10; whereas, the GUI 146 may provide the operator with a visual indicator associated with the instantaneous displacements of the various ground engaging tools 38 for the portion of the field currently being traversed by the implement 10.

It should be appreciated that, in addition to providing the user visual notifications via an associated user interface (or as an alternative thereto), the controller 112 may also be configured to automatically control the operation of one or more components of the implement 10 and/or the work vehicle 12 (e.g., the vehicle's engine or transmission) in a manner that reduces the ground speed of the implement 10 and/or the work vehicle 12 when displacement of the ground engaging tool 38 has exceeded the first and/or second threshold displacement values 132, 134. In even further embodiments, the controller 112 may be configured to initiate any other suitable control action. For instance, as will be described below with reference to FIG. 5, the controller 112 may be configured to automatically adjust the down pressure exerted on the ground engaging tools 38 by the biasing elements 102 so as to reduce the displacements defined between the current positions of the ground engaging tools 38 and the predetermined ground engaging tool positions.

Utilizing the system configuration shown in FIG. 5, the controller 112 may be configured to automatically control the operation of the actuator 120 so as to increase the down pressure on the ground engaging tool 38. Specifically, as indicated above, the controller 112 may be configured to determine when the displacement of one or more the ground engaging tools 38 have exceeded the first and/or second threshold displacement values 132, 134. When the displacement of the ground engaging tool(s) 38 has exceeded the first and/or second threshold displacement values 132, 134, the controller 112 may be configured to electronically control operation of the associated PRV(s) 124 to adjust the fluid pressure supplied within the associated actuator(s) 120. For instance, the controller 112 may be configured to control the operation of the PRV(s) 124 such that the fluid pressure supplied to the actuator(s) 120 is increased when it is determined that the displacement of the ground engaging tool(s) 38 has exceeded the first and/or second threshold displacement values 132, 134. Increasing the fluid pressure within the actuator 120 may increase the down pressure on the ground engaging tool 38, which, in turn, may reduce the displacement defined between the current position of the ground engaging tool 38 and the predetermined ground engaging tool position.

Moreover, in accordance with aspects of the present subject matter, the controller 112 may be configured to initiate different control actions when the displacement(s) of one or more of the ground engaging tools 38 exceed the first and second threshold displacements 132, 134. For example, in one embodiment, the controller 112 may be configured to provide notifications to the operator of the implement 10 when the displacement(s) of one or more of the ground engaging tools 38 has exceeded the first threshold displacement value 132 (e.g., via changing the visual appearance of one or more of the interface elements of the GUI 146) and subsequently reduce the ground speed of the implement 10 and/or the work vehicle 12 when the displacement(s) of one or more of the ground engaging tools 38 has exceeded the second threshold displacement values 134. In another embodiment, the controller 112 may be configured to provide notifications to the operator of the implement 10 when the displacement(s) of one or more of the ground engaging tools 38 has exceeded the first threshold displacement value 132 (e.g., via changing the visual appearance of one or more of the interface elements of the GUI 146) and adjust the down pressure exerted on such ground engaging tool(s) 38 with the associated biasing element(s) 102 when the displacement(s) of the ground engaging tool(s) 38 has exceeded the second threshold displacement value 134. However, it should be appreciated that, in alternative embodiments, the controller 112 may be configured to initiate any other suitable combination of control actions when the displacement(s) of one or more of the ground engaging tools 38 exceeds both of the first and second threshold displacements 132, 134, such as the same control action for each threshold.

Figure 11:
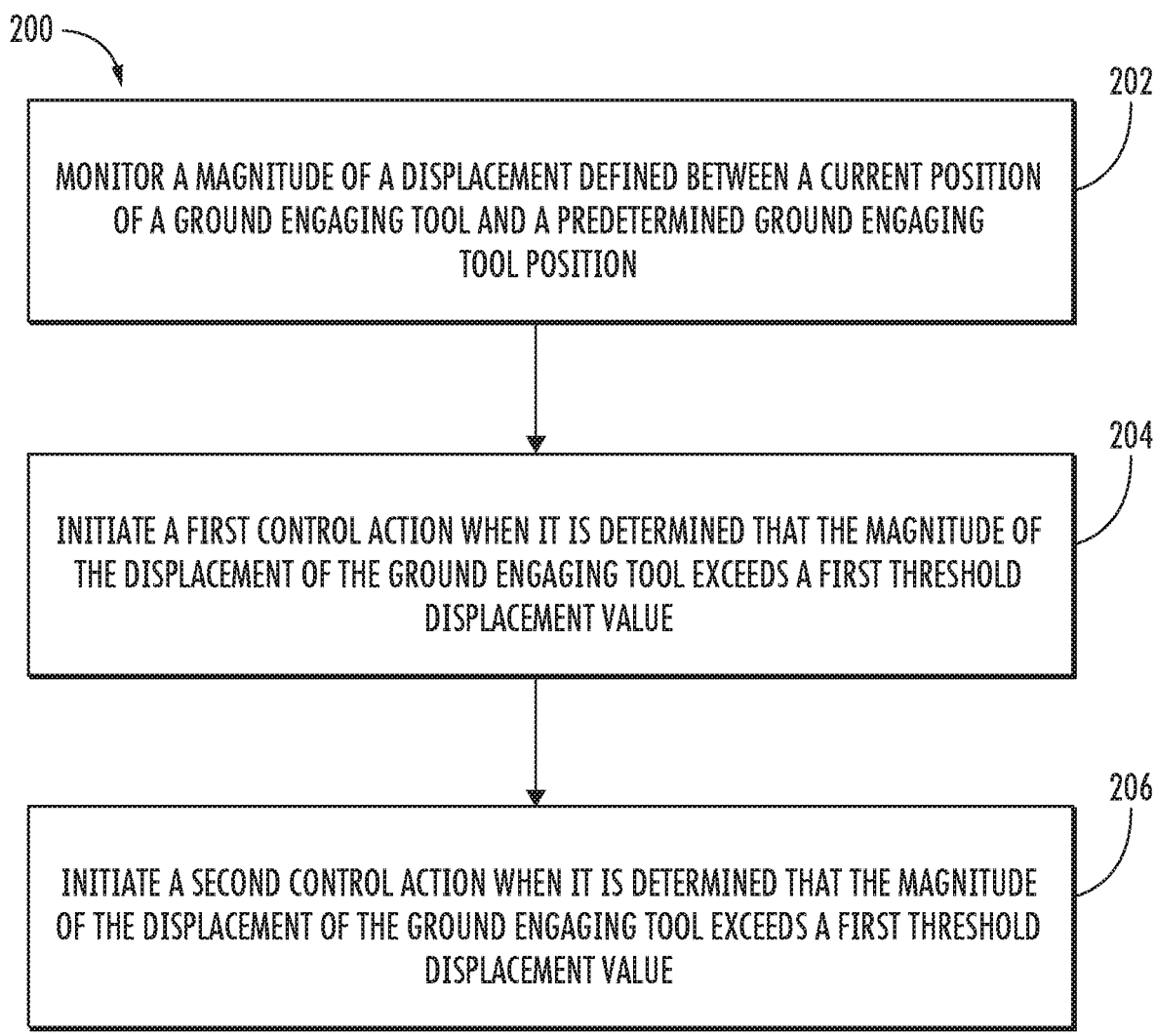
FIG. 11 illustrates a flow diagram of one embodiment of a method for monitoring the displacement of a ground engaging tool of an agricultural implement in accordance with aspects of the present subject matter.

Referring now to FIG. 11, a flow diagram of one embodiment of a method 200 for monitoring the displacement of a ground engaging tool of an agricultural implement is illustrated in accordance with aspects of the present subject matter. In general, the method 200 will be described herein with reference to the implement 10 and the system 100 described above with reference to FIGS. 1-10. However, it should be appreciated by those of ordinary skill in the art that the disclosed method 200 may generally be utilized to monitor the displacement of aground engaging tool for any agricultural implement having any suitable implement configuration and/or of any system having any system configuration. In addition, although FIG. 11 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 11, at (202), the method 200 may include monitoring a magnitude of a displacement defined between s current position of a ground engaging tool and a predetermined ground engaging tool position. For instance, as indicated above, the controller 112 may be communicatively coupled to one or more sensor(s) 106 configured to monitor an operating parameter indicative of the current position(s) of one or more of the ground engaging tool(s) 38 relative to the frame 20. As such, measurement signals or sensor data 118 transmitted from the sensor(s) 106 may be received by the controller 112 for monitoring the displacement(s) of the ground engaging tool(s) 38 relative to its predetermined ground engaging tool position(s).

Additionally, at (204), the method 200 may include initiating a first control action when it is determined that the magnitude of the displacement of the ground engaging tool exceeds a first threshold displacement value. As indicated above, such control actions may include controlling one or more components of the implement 10 and/or the work vehicle 12. For instance, as indicated above, the controller 112 may, in one embodiment, be configured to control one or more operator-interface components located within the vehicle's cab to allow a visual and/or audible notification to be presented to the operator. In addition, or as an alternative thereto, the controller 112 may be configured to automatically initiate a control action that results in the ground speed of the implement 10 and/or the work vehicle 12 being reduced, such as by automatically controlling the operation of the vehicle's engine and/or transmission. Moreover, as described above with reference to FIG. 5, the controller 112 may also be configured to actively regulate the pressure of the fluid supplied within associated actuator(s) 120 (e.g., by electronically controlling the associated PRV 124) to adjust the down pressure on the ground engaging tool(s) 38.

Moreover, as shown in FIG. 11, at (206), the method 200 may include initiating a second control action when it is determined that the magnitude of the displacement of the ground engaging tool exceeds a second threshold displacement value. As indicated above, such control actions may include controlling one or more components of the implement 10 and/or the work vehicle 12. For instance, as indicated above, the controller 112 may, in one embodiment, be configured to control one or more operator-interface components located within the vehicle's cab to allow a visual and/or audible notification to be presented to the operator. In addition, or as an alternative thereto, the controller 112 may be configured to automatically initiate a control action that results in the ground speed of the implement 10 and/or the work vehicle 12 being reduced, such as by automatically controlling the operation of the vehicle's engine and/or transmission. Moreover, as described above with reference to FIG. 5, the controller 112 may also be configured to actively regulate the pressure of the fluid supplied within associated actuator(s) 120 (e.g., by electronically controlling the associated PRV 124) to adjust the down pressure on the ground engaging tool(s) 38.

Figure 12:
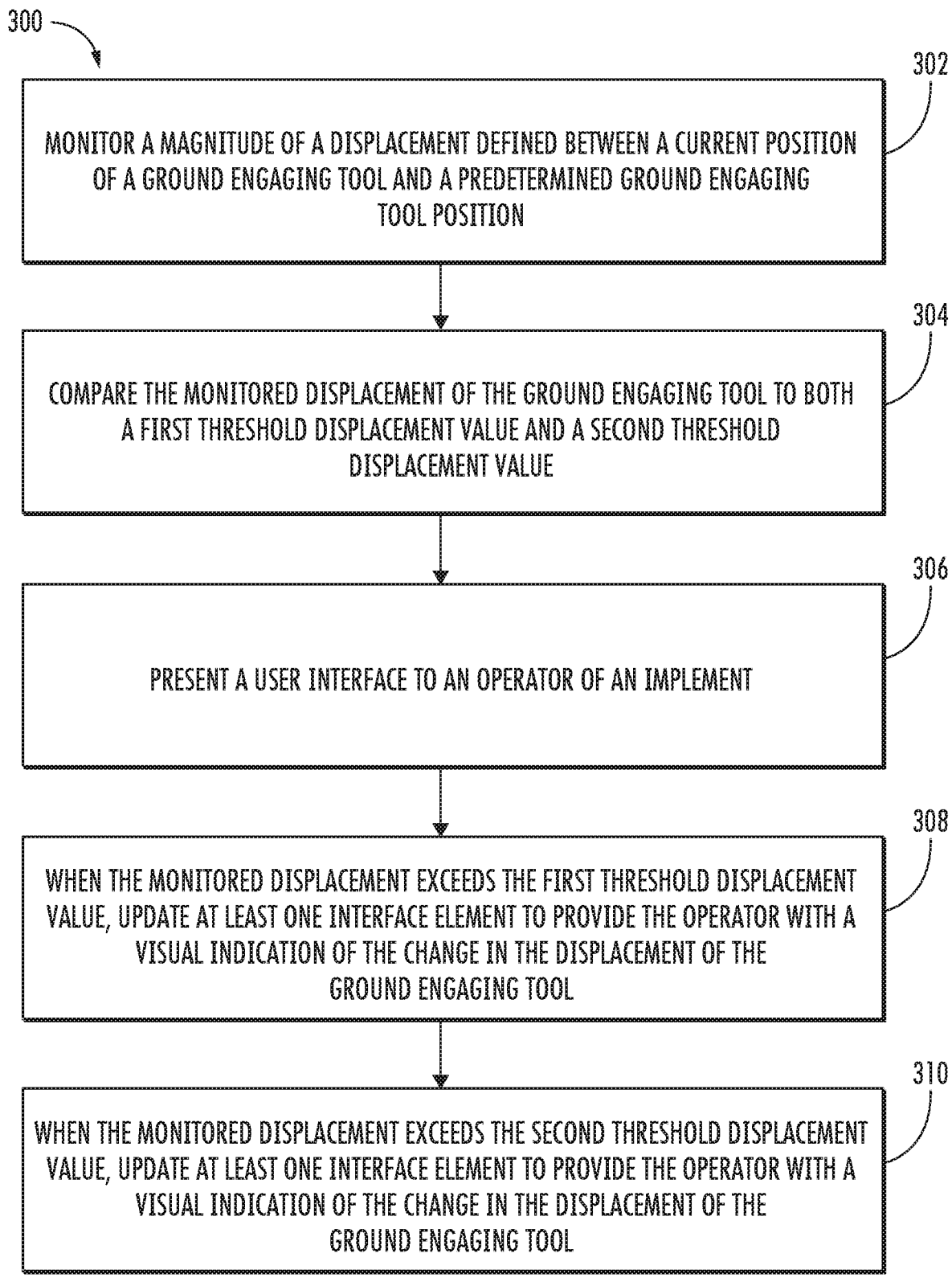
FIG. 12 illustrates a flow diagram of another embodiment of a method for monitoring the displacement of a ground engaging tool of an agricultural implement in accordance with aspects of the present subject matter.

Moreover, referring now to FIG. 12, a flow diagram of another embodiment of a method 300 for monitoring the displacement of a ground engaging tool of an agricultural implement is illustrated in accordance with aspects of the present subject matter. In general, the method 300 will be described herein with reference to the implement 10 and the system 100 described above with reference to FIGS. 1-10. However, it should be appreciated by those of ordinary skill in the art that the disclosed method 300 may generally be utilized to monitor the displacement of a ground engaging tool for any agricultural implement having any suitable implement configuration and/or of any system having any system configuration. In addition, although FIG. 12 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 12, at (302), the method 300 may include monitoring a magnitude of a displacement defined between a current position of a ground engaging tool and a predetermined ground engaging tool position. For instance, as indicated above, the controller 112 may be communicatively coupled to one or more sensor(s) 106 configured to monitor an operating parameter indicative of the current position(s) of one or more of the ground engaging tool(s) 38 relative to the frame 20. As such, measurement signals or sensor data 118 transmitted from the sensor(s) 106 may be received by the controller 112 for monitoring the displacement(s) of the ground engaging tool(s) 38 relative to its predetermined ground engaging tool position(s).

At (304), the method 300 may include comparing the monitored displacement of the ground engaging tool to a first threshold displacement value and a second threshold displacement value. For instance, as described above with reference to FIG. 6, the controller 112 may be configured to compare the monitored displacement(s) of one or more of the ground engaging tool 38 to first and second threshold displacement values 132, 134. In one embodiment, the second threshold displacement value 134 may generally correspond to a greater displacement than the first threshold displacement value 132.

As shown in FIG. 12, at (306), the method 300 may include presenting a user interface to an operator of the implement. For instance, as described above with reference to FIGS. 7 through 10, the controller 112 may be configured to present the GUI 146 that a corresponding display device so as to provide an operator with a visual indicator associated with the monitored tool displacements of the various ground engaging tools 38 of an implement 10. As such, the GUI 146 may include various interface elements or objects that are configured to provide to serve as visual indicators of the displacement values of the various ground engaging tools 38 and/or of a tillage output(s) that vary as a function of the tool displacement (e.g., seedbed quality), such as the visual representation or image 148; the numerical indicators 150, 152, 154, 155; and/or the graphical indicators 156, 158, 160.

At (308), when the monitored displacement exceeds the first threshold displacement value, the method 300 may include updating, at least one interface element to provide the operator with a visual indication of the change in the displacement of the ground engaging tool. For instance, as described above with reference to FIGS. 7 through 10, the controller 112 may be configured to vary the color, size, shape, numerical value, and/or profile of one or more of the interface elements of the GUI 146 (e.g., the visual representation or image 148; the numerical indicators 150, 152, 154, 155; and/or the graphical indicators 156, 158, 160) to provide the operator of the implement 10 with a visual indication that the displacement(s) of one or more the ground engaging tools 38 has exceeded the first threshold displacement value 132.

Furthermore, at (310), when the monitored displacement exceeds the second threshold displacement value, the method 300 may include updating at least one interface element to provide the operator with a visual indication of the change in the displacement of the ground engaging tool. For instance, as described above with reference to FIGS. 7 through 10, the controller 112 may be configured to vary the color, size, shape, numerical value, and/or profile of one or more of the interface elements of the GUI 146 (e.g., the visual representation or image 148; the numerical indicators 150, 152, 154, 155; and/or the graphical indicators 156, 158, 160) to provide the operator of the implement 10 with a visual indication that the displacement(s) of one or more the ground engaging tools 38 has exceeded the second threshold displacement value 132.

Figure 13:
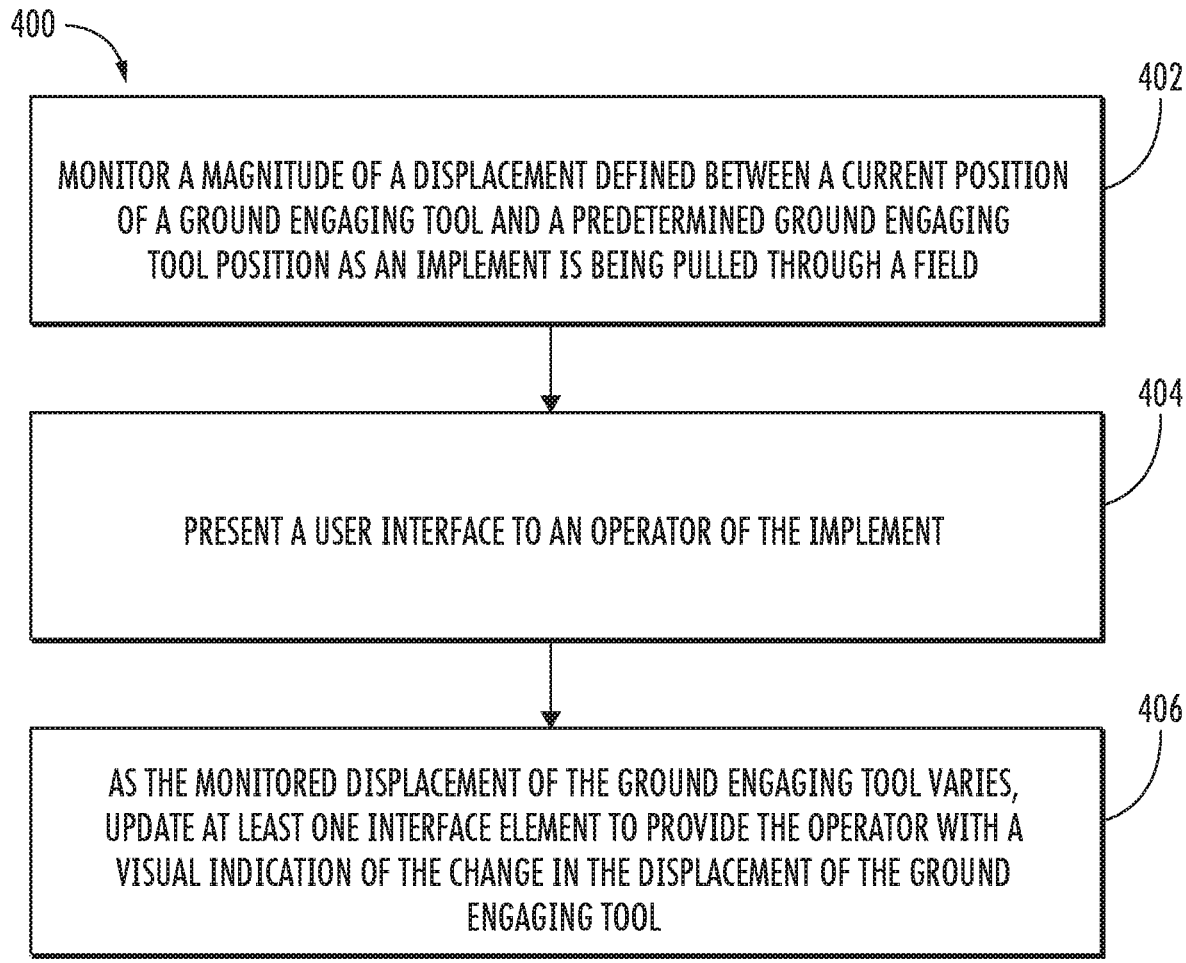
FIG. 13 illustrates a flow diagram of a further embodiment of a method for monitoring the displacement of a ground engaging tool of an agricultural implement in accordance with aspects of the present subject matter.

Additionally, referring now to FIG. 13, a flow diagram of a further embodiment of a method 400 for monitoring the displacement of a ground engaging tool of an agricultural implement is illustrated in accordance with aspects of the present subject matter. In general, the method 400 will be described herein with reference to the implement 10 and the system 100 described above with reference to FIGS. 1-10. However, it should be appreciated by those of ordinary skill in the art that the disclosed method 400 may generally be utilized to monitor the displacement of a ground engaging tool for any agricultural implement having any suitable implement configuration and/or of any system having any system configuration. In addition, although FIG. 13 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 13, at (402), the method 400 may include monitoring a magnitude of a displacement defined between a current position of a ground engaging tool and a predetermined ground engaging tool position as an implement is being pulled through a field. For instance, as indicated above, the controller 112 may be communicatively coupled to one or more sensor(s) 106 configured to monitor an operating parameter indicative of the current position(s) of one or more of the ground engaging tool(s) 38 relative to the frame 20. As such, measurement signals or sensor data 118 transmitted from the sensor(s) 106 may be received by the controller 112 for monitoring the displacement(s) of the ground engaging tool(s) 38 relative to its predetermined ground engaging tool position(s).

At (404), the method 400 may include presenting a user interface to an operator of the implement. For instance, as described above with reference to FIGS. 7 through 10, the controller 112 may be configured to present the GUT 146 that a corresponding display device so as to provide an operator with a visual indicator associated with the monitored tool displacements of the various ground engaging tools 38 of an implement 10. As such, the GUI 146 may include various interface elements or objects that are configured to provide to serve as visual indicators of the displacement values of the various ground engaging tools 38 and/or of a tillage output(s) that vary as a function of the tool displacement (e.g., seedbed quality), such as the visual representation or image 148; the numerical indicators 150, 152, 154, 155; and/or the graphical indicators 156, 158, 160.

As shown in FIG. 13, at (406), as the monitored displacement of the grounding engaging tool varies, the method 400 may include updating at least one interface element to provide the operator with a visual indication of the change in the displacement of the ground engaging tool. For instance, as described above with reference to FIGS. 7 through 10, the controller 112 may be configured to vary the color, size, shape, numerical value, and/or profile of one or more of the interface elements of the GUI 146 (e.g., the visual representation or image 148; the numerical indicators 150, 152, 154, 155; and/or the graphical indicators 156, 158, 160) to provide the operator of the implement 10 with a visual indication of the change(s) in the displacement(s) of one or more the ground engaging tool(s) 38 of the implement 10 as the implement 10 is pulled through the field.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for monitoring the displacement of a ground engaging tool of an agricultural implement, the system comprising:

an implement including a frame and a ground engaging tool pivotally coupled to the frame, the ground engaging tool configured to be biased to a predetermined ground engaging tool position relative to the frame;

a sensor configured to detect a parameter indicative of a current position of the ground engaging tool relative to the frame; and a controller communicatively coupled to the sensor, the controller being configured to:
monitor a magnitude of a displacement defined between the current position of the ground engaging tool and the predetermined ground engaging tool position based on measurement signals received from the sensor;
initiate a first control action when the magnitude of the displacement of the ground engaging tool exceeds a first threshold displacement value; and
initiate a second control action when the magnitude of the displacement of the ground engaging tool exceeds a second threshold displacement value, the second threshold displacement value corresponding to a greater displacement relative to the predetermined ground engaging tool position than the first displacement threshold value.

2. The system of claim 1, wherein the controller is further configured to initiate a third control action when the magnitude of the displacement of the ground engaging tool falls below the first threshold displacement value, the third control action being associated with increasing a ground speed of the implement.

3. The system of claim 1, wherein the first control action corresponds to presenting an interface element within a user interface displayed to an operator of the implement that provides the operator with a visual indicator associated with the displacement of the ground engaging tool and the second control action corresponds to updating the interface element when the displacement of the ground engaging tool exceeds the second threshold displacement value.

4. The system of claim 1, wherein the first control action corresponds to presenting an interface element within a user interface displayed to an operator of the implement that provides the operator with a visual indicator associated with the displacement of the ground engaging tool and the second control action is associated with reducing a ground speed of the implement.

5. The system of claim 1, wherein the first control action corresponds to presenting an interface element within a user interface displayed to an operator of the implement that provides the operator with a visual indicator associated with the displacement of the ground engaging tool and the second control action is associated with adjusting a down pressure exerted on the ground engaging tool.

6. The system of claim 1, wherein the controller is configured to identify a time period across which the displacement of the ground engaging tool exceeds at least one of the first threshold displacement value or the second threshold displacement value and compare the identified time period to the threshold time period.

7. The system of claim 1, wherein the sensor comprises a rotary sensor coupled to one of the frame or the ground engaging tool and a sensor linkage coupled between the rotary sensor and the other of the frame or the ground engaging tool, the rotary sensor being configured to detect an angle between the frame and the ground engaging tool, the angle being indicative of the current position of the ground engaging tool relative to the frame.

8. The system of claim 1, further comprising:
a fluid-driven actuator configured to adjust a down pressure exerted on the ground engaging tool based on a fluid pressure associated with the fluid-driven actuator.

9. The system of claim 8, wherein the sensor comprises a pressure sensor configured to detect the fluid pressure associated with the fluid-driven actuator, the fluid pressure being indicative of the current position of the ground engaging tool relative to the frame.

10. The system of claim 1, wherein the controller is further configured to generate a field map that visually identifies the monitored displacement of the ground engaging tool relative to the first threshold displacement value and the second threshold displacement value for a field traversed by the implement.

11. A method for monitoring a displacement of a ground engaging tool of an agricultural implement, the ground engaging tool being normally biased to a predetermined ground engaging tool position relative to a frame of the implement, the method comprising:
monitoring, with a computing device, a magnitude of a displacement defined between a current position of the ground engaging tool and the predetermined ground engaging tool position;
initiating, with the computing device, a first control action when the magnitude of the displacement of the ground engaging tool exceeds a first threshold displacement value; and
initiating, with the computing device, a second control action when the magnitude of the displacement of the ground engaging tool exceeds a second threshold displacement value, the second threshold displacement value corresponding to a greater displacement relative to the predetermined ground engaging tool position than the first displacement threshold value.

12. The method of claim 11, further comprising:
initiating, with the computing device, a third control action when the magnitude of the displacement of the ground engaging tool falls below the first threshold displacement value, the third control action being associated with increasing a ground speed of the implement.

13. The method of claim 11, wherein initiating the first control action comprises presenting an interface element within a user interface displayed to an operator of the implement that provides the operator with a visual indicator associated with the displacement of the ground engaging tool and initiating the second control action comprises updating the interface element when the displacement of the ground engaging tool exceeds the second threshold displacement value.

14. The method of claim 11, wherein initiating the first control action comprises presenting an interface element within a user interface displayed to an operator of the implement that provides the operator with a visual indicator associated with the displacement of the ground engaging tool and initiating the second control action comprises reducing a ground speed of the implement.

15. The method of claim 11, wherein initiating the first control action comprises presenting an interface element within a user interface displayed to an operator of the implement that provides the operator with a visual indicator associated with the displacement of the ground engaging tool and initiating the second control action comprises adjusting a down pressure exerted on the ground engaging tool.

16. The method of claim 11, further comprising:
identifying, with the computing device, a time period across which the displacement of the ground engaging tool exceeds at least one of the first threshold displacement values or the second threshold displacement value; and
comparing, with the computing device, the identified time period to the threshold time period.

17. The method of claim 11, further comprising:
generating, with the computing device, a field map that visually identifies the monitored displacement of the ground engaging tool relative to the first threshold displacement value and the second threshold displacement value for a field traversed by the implement.

* * * * *